United States Patent
Javed Lal Mohammed Ameerjan et al.

(10) Patent No.: US 10,572,094 B2
(45) Date of Patent: *Feb. 25, 2020

(54) GAMIFYING A NON-GAMING APPLICATION USING AUDITING DATA OF THE NON-GAMING APPLICATION

(71) Applicant: Oracle International Corporation, Redwood Shores, CA (US)

(72) Inventors: Shoaib Javed Lal Mohammed Ameerjan, Tamil Nadu (IN); Michael Patrick Rodgers, Orange, CA (US); Filipe Leahy-Dios, Bracknell (GB); Gary Taft Grieshaber, Littleton, CO (US); Gurbinder Singh Bali, Highlands Ranch, CO (US); Rudolph E. Lukez, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,775

(22) Filed: May 21, 2018

(65) Prior Publication Data

US 2018/0267654 A1 Sep. 20, 2018

Related U.S. Application Data

(63) Continuation of application No. 14/845,953, filed on Sep. 4, 2015, now Pat. No. 10,001,896.

(Continued)

(51) Int. Cl.
*A63F 9/24* (2006.01)
*G06F 3/048* (2013.01)
*A63F 13/85* (2014.01)
*A63F 13/35* (2014.01)
*A63F 13/30* (2014.01)

(52) U.S. Cl.
CPC .............. *G06F 3/048* (2013.01); *A63F 13/30* (2014.09); *A63F 13/35* (2014.09); *A63F 13/85* (2014.09)

(58) Field of Classification Search
CPC .......... A63F 13/30; A63F 13/35; A63F 13/85; G06F 3/048
See application file for complete search history.

(56) References Cited

U.S. PATENT DOCUMENTS 5,970,143 A * 10/1999 Schneier .................. A63F 13/71
                                                                  380/251
2004/0039624 A1* 2/2004 Ikezawa ........... G06Q 10/06311
                                                                  705/7.13

(Continued)

*Primary Examiner* — Justin L Myhr
(74) *Attorney, Agent, or Firm* — Vista IP Law Group, LLP

(57) ABSTRACT

Systems to gamify a data processing application using auditing data. Processing commences upon accessing electronic records comprising a set of application auditing specifications that identify one or more transaction types to be executed by a data processing application. Certain transactions corresponding to the identified transaction types are observed by an auditing facility during operation of the data processing application. At least some of the identified transaction types and measured audit parameters corresponding to the transactions are recorded. A gamification module associates the measured audit parameters with game parameters. Motivational imagery such as a scoreboard is generated for display.

25 Claims, 21 Drawing Sheets

Related U.S. Application Data

(60) Provisional application No. 62/055,288, filed on Sep. 25, 2014.

(56) References Cited

U.S. PATENT DOCUMENTS

| | | | | |
|---|---|---|---|---|
| 2012/0083331 A1* | 4/2012 | Carpenter | ............ | G07F 17/3286 |
| | | | | 463/25 |
| 2013/0046661 A1* | 2/2013 | Levin | .................... | G06Q 40/02 |
| | | | | 705/30 |
| 2013/0096981 A1* | 4/2013 | Evans | ................ | G06Q 30/0201 |
| | | | | 705/7.29 |
| 2013/0171594 A1* | 7/2013 | Gorman | ................... | G09B 5/00 |
| | | | | 434/219 |
| 2014/0058801 A1* | 2/2014 | Deodhar | ............ | G06Q 10/0639 |
| | | | | 705/7.38 |

\* cited by examiner

US 10,572,094 B2

GAMIFYING A NON-GAMING APPLICATION USING AUDITING DATA OF THE NON-GAMING APPLICATION

RELATED APPLICATIONS

The present application is a continuation of U.S. patent application Ser. No. 14/845,953, entitled "GAMIFICATION PLATFROM", filed Sep. 4, 2015 which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of data processing applications, and more particularly to techniques for automatic gamification of data processing applications using performance and auditing instrumentation.

BACKGROUND

Gamification is the concept of applying game dynamics (e.g., player interaction, game play mechanics, etc.) in non-game contexts to enhance user engagement and performance. For example, gamification can be applied to business computer applications to engage and incentivize the application users (e.g., to be more productive) by including features reminiscent of computer games in the applications. Further, gamification can bridge the gap between what might be considered two distinct and mutually exclusive domains (e.g., business applications and games) by incorporating into the non-game environment the elements of what makes games and game play so compelling and engaging.

However, "gamifying" business applications has been limited. One legacy approach to gamification requires that each business application is independently upgraded with custom code to include game dynamics. Another legacy approach requires that a third-party gamification platform is integrated into the business application, again requiring custom code to enable the integration into each application. Such approaches are costly in terms of time, resources, and the risk of disrupting the function and operation of the underlying application. While the stakeholders of many businesses acknowledge the value of enhanced workforce motivation and productivity resulting from gamification, modifying their existing applications and/or integrating a third-party gamification platform is an expensive, inefficient, and a risky application-by-application approach. Techniques are therefore needed to address the problem of cost-effectively and non-intrusively integrating game dynamics into current and new enterprise applications, for example, by using predetermined performance instrumentation and predetermined auditing specifications.

None of the aforementioned legacy approaches achieve the capabilities of the herein-disclosed techniques for automatic gamification of enterprise applications using performance instrumentation and auditing specifications. Therefore, there is a need for improvements.

SUMMARY

The present disclosure provides improved systems, methods, and computer program products suited to address the aforementioned issues with legacy approaches. More specifically, the present disclosure provides a detailed description of techniques used in systems, methods, and in computer program products for automatic gamification of enterprise applications using performance and auditing instrumentation. The various embodiments address the problem of cost-effectively and non-intrusively integrating game dynamics into current and new enterprise applications. Certain embodiments are directed to approaches for providing a gamification platform that uses operations and data items of an enterprise application to automatically apply game dynamics, which embodiments advance the technical fields for addressing the problem of cost-effectively and non-intrusively integrating game dynamics into current and new enterprise applications, as well as advancing peripheral technical fields. The disclosed embodiments modify and improve over conventional approaches, and some embodiments and techniques disclosed herein improve the functioning of multiple systems within the disclosed environments.

Embodiments include methods and systems to gamify an enterprise application using auditing data. Processing commences upon accessing electronic records comprising a set of application auditing specifications that identify one or more transaction types to be executed by a data processing application. Certain transactions corresponding to the identified transaction types are observed by an auditing facility during operation of the enterprise application. At least some of the identified transaction types and measured audit parameters corresponding to the transactions are recorded. A gamification module associates the measured audit parameters with game parameters. Motivational imagery such as a scoreboard is generated for display.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
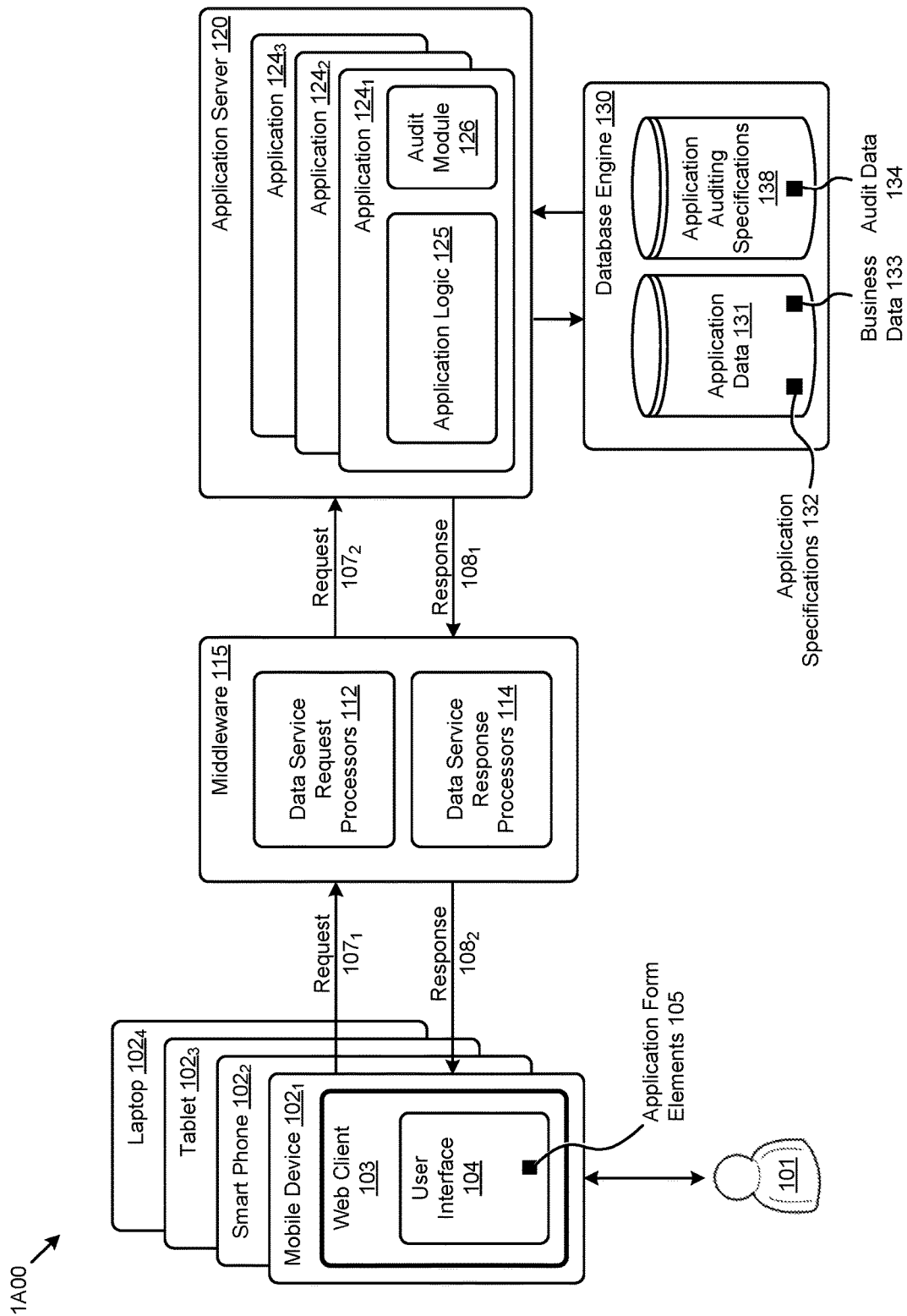
FIG. 1A exemplifies an environment that supports deployment and operation of enterprise applications.

Some embodiments of the present disclosure address the problem of cost-effectively and non-intrusively integrating game dynamics into current and new enterprise applications and some embodiments are directed to approaches for providing a gamification platform that uses operations and data items of a data processing application to automatically apply game dynamics based on performance instrumentation and auditing specifications. More particularly, disclosed herein and in the accompanying figures are exemplary environments, systems, methods, and computer program products for automatic gamification of enterprise applications using predetermined audit specifications.

Overview

Gamification is the concept of applying game dynamics (e.g., player interaction, game play mechanics, etc.) in non-game contexts to enhance user engagement and performance. For example, gamification can be applied to business computer applications to engage and incentivize the application users (e.g., to be more productive) by including features reminiscent of computer games in the applications. Legacy approaches have limited the "gamifying" of business applications. One legacy approach to gamification requires that each business application is independently upgraded with custom code to include game dynamics. Another legacy approach requires that a third-party gamification platform is integrated into the business application, again requiring custom code to enable the integration into each application. Such approaches are costly in terms of time, resources, and the risk of disrupting the function and operation of the underlying application. Techniques are therefore needed to address the problem of cost-effectively and non-intrusively integrating game dynamics into current and new enterprise applications.

The present disclosure describes techniques for automatic gamification of enterprise applications using performance and auditing instrumentation. Such techniques describe a gamification platform that can enable automatic gamification of an enterprise application (such as a data processing application) using the audit data (e.g., using performance instrumentation, audit specifications, audit rules, audit data, etc.). This approach is based on the observation that most user interactions with an enterprise application result in one or more respective database transactions (e.g., creating, reading, updating, and/or deleting a database record) that is associated with one or more respective business transactions (e.g., reporting a safety incident, provisioning a new user, entering a new sales order, matching a voucher, etc.). More specifically, performance and/or audit specifications present in many enterprise applications monitor such business transactions, and the resulting audit data can be used to determine one or more sets of game specifications for gamifying the enterprise application. In some cases, and as in the herein disclosed, a gamification platform can automatically determine the game specifications (e.g., default game specifications), and/or game parameters (e.g., default game parameters) of the game(s) to be deployed, for example by using pre-existing performance instrumentation, pre-existing audit specifications, pre-existing audit rules, pre-existing audit data, etc. In other cases, an administrator can customize the combination of criteria made available by the gamification platform to determine game specifications of the game(s) to be deployed. Such administrators gamify a given enterprise application having only a basic understanding of the business transactions associated with the application, and limited computer usage skills and knowledge of gamification techniques. In other embodiments, administrators can gamify a given enterprise application by merely accepting a set of default game parameters.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies an environment 1A00 that supports deployment and operation of enterprise applications. As an option, one or more instances of environment 1A00 or any aspect thereof may be implemented in the context of the architecture and functionality of the embodiments described herein. Also, the environment 1A00 or any aspect thereof may be implemented in any desired environment.

Environment 1A00 depicts an example of a user 101 interacting with a web client 103 (e.g., a "thin client") that can operate on various external systems (e.g., a mobile device $102_1$, a smart phone $102_2$, a tablet $102_3$, a laptop $102_4$, etc.). The web client 103 can provide the user 101 access (e.g., through a network connection) to one or more enterprise applications, such as the plurality of applications 124 (e.g., application $124_1$, application $124_2$, and application $124_3$, etc.) and a set of application data 131. Specifically, web client 103 on mobile device $102_1$ can communicate with middleware 115 (e.g., a web server) using various requests (e.g., request $107_1$) and responses (e.g., response $108_2$). As shown, the middleware 115 can comprise any of a variety of data service request processors 112 and data service response processors 114. Requests from the web client 103 (e.g., see request $107_1$) can be processed by the data service request processors 112 and forwarded (e.g., see request $107_2$) to the plurality of applications 124 for additional processing. Responses from the plurality of applications 124 (e.g., see response $108_1$) can be processed by the data service response processors 114 and returned (e.g., see response $108_2$) to the web client 103. Reasonable formats and protocols for communicating the requests and responses can have many variations (e.g., HTTP, JSON, XML, API, etc.). Other possibilities include formats to specify semantics of "create", "read", "update" and "delete" operations on the application data 131 as directed by the plurality of applications 124.

As further shown in FIG. 1A, web client 103 can comprise a user interface 104. As an example, the user interface 104 can support a form-oriented user interface, rendering forms that enable the user to interact with the plurality of applications 124. Such forms comprise one or more elements (e.g., application form elements 105), with each element conforming to semantics (e.g., data type, data size, etc.) and/or having a set of associated event handlers (e.g., on click, on change, etc.). The user interface 104 can further support a decoupling of the events and data associated with a form from the presentation (e.g., rendering) of the elements and data in the user interface. Given these and other capabilities of the user interface 104, request $107_1$ and request $107_2$ can comprise events and data related to the interaction of a user at the user interface 104, and response $108_2$ and response $108_1$ can comprise directives and data from the plurality of applications 124 to be processed and rendered by the user interface 104.

Referring again to environment 1A00, the plurality of applications 124 can be hosted by an application server 120 (e.g., a Java application server (JAS)). Each instance of the plurality of applications 124 can execute a set of application logic 125 and other processes and operations that provide, in part, the functionality and capability of the respective application. As an example, application $124_1$ can further comprise an audit module 126 to manage and execute audit operations according to a set of audit parameters related to application $124_1$ (e.g., monitoring business transactions). As shown, a database engine 130 can also be coupled to the application server 120 and control access to the store of application data 131 (e.g., relational data, flat data, raw data, metadata, etc.). In the example shown in environment 1A00, the application data 131 comprises various sets of data, such as application specifications 132 and business data 133. The database of application auditing specifications 138 comprises audit data 134. The application specifications 132 can be used, in part, to define the behavior of the application. The business data 133 can comprise the data describing the various business transactions (e.g., specific create, read, update, and delete operations) executed by the application. Further, the audit data 134 can comprise the data describing the audit parameters (e.g., specifying the monitoring of business transactions, etc.) executed by the audit module 126 and the resulting captured audit records. Such "instrumentation" for auditing business transactions and related performance metrics can be found in many enterprise applications. In some cases, auditing instrumentation and usage is mandated by statutory requirements. Strictly as examples, audit parameters can refer to counts (e.g., counts of transaction records), a rate of occurrence of new transactions, a rate of occurrence of updates to transactions, a rate of occurrence of closed transaction, a rate of occurrence of updates to a table, etc.

The environment 1A00 can be representative of any environment supporting one or more enterprise applications that are desired to be "gamified". Approaches for automatic gamification of such enterprise applications are disclosed in FIG. 1B and the herein disclosed techniques.

Figure 1B:
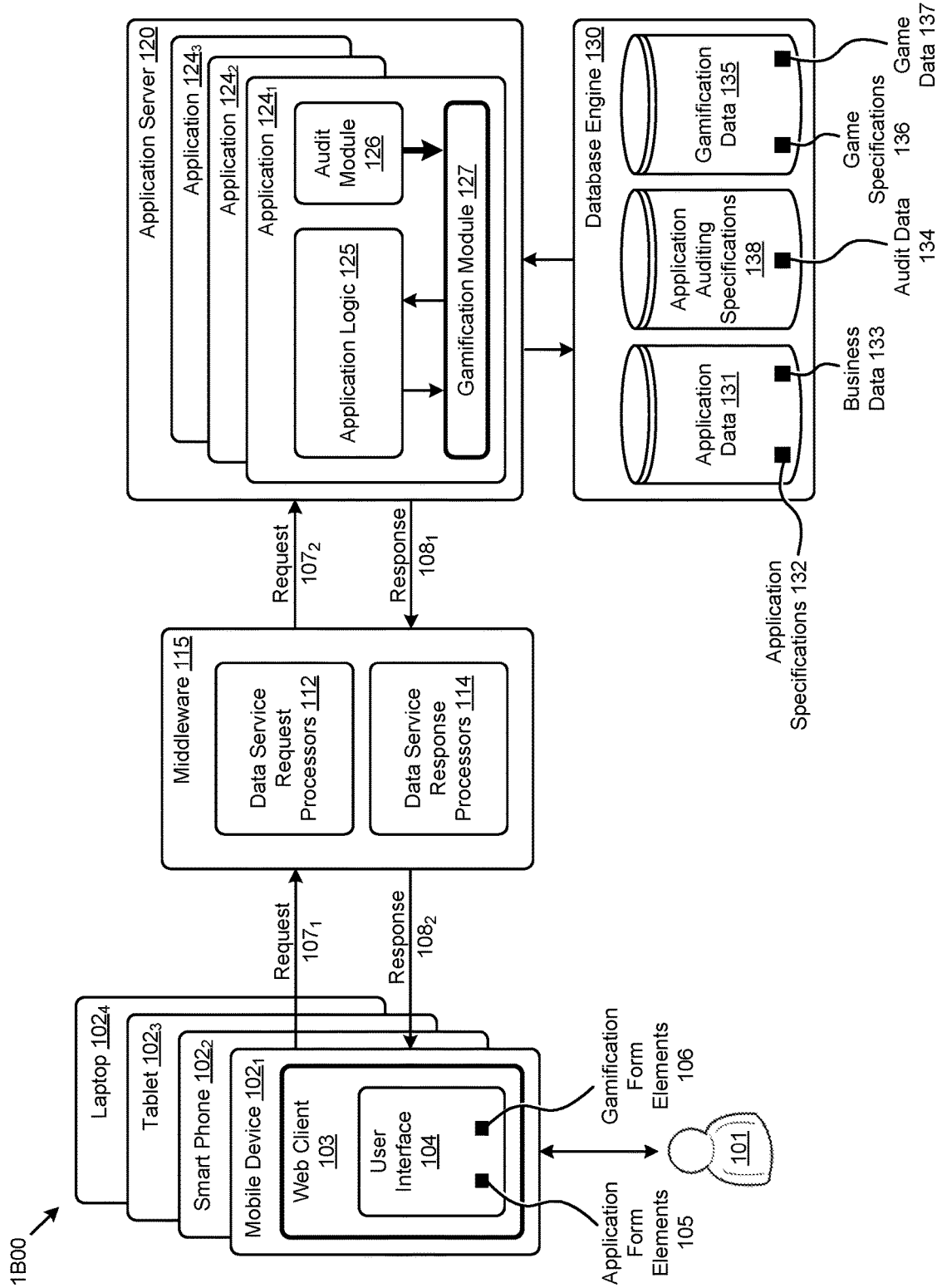
FIG. 1B is an environment illustrating an implementation of automatic gamification of enterprise applications using performance and auditing instrumentation, according to some embodiments.

FIG. 1B is an environment 1B00 illustrating an implementation of automatic gamification of enterprise applications using performance and auditing instrumentation. As an option, one or more instances of environment 1B00 or any aspect thereof may be implemented in the context of the architecture and functionality of the embodiments described herein. Also, the environment 1B00 or any aspect thereof may be implemented in any desired environment.

The environment 1B00 comprises the components of environment 1A00 and additional components to support automatic gamification of enterprise applications using performance and auditing instrumentation. Specifically, environment 1B00 further comprises a gamification module 127 in application $124_1$, and a store of gamification data 135 accessible by application $124_1$. Further, a set of gamification form elements 106 (e.g., for game setup, game play, etc.) are supported by the user interface 104. In one or more embodiments, a set of game specifications 136 in the store of gamification data 135 comprise game parameters that describe the game to be executed and can include the game "grammar" (e.g., the game context, narrative, objective, duration, roles, etc.), the game "verbs" (e.g., the game metrics, rules, competitive dynamics, collaborative dynamics, etc.), and the game "nouns" (e.g., the game accomplishments, visual indicators, etc.). Once one or more games have been specified and launched, a set of game data 137 can be collected and used for various purposes (e.g., aggregating activity, results, accomplishments, etc.).

In legacy gamification approaches, the game grammar portion of the game specifications 136 can be a complex component to integrate with existing enterprise applications since it defines the association of certain business transactions with a specific game narrative. However, the gamification "platform" (e.g., gamification module 127, gamification data 135, and gamification form elements 106) described in environment 1B00 can enable automatic gamification of application $124_1$ using the audit instrumentation (e.g., audit module 126, audit data 134, etc.) associated with application $124_1$. This approach is based on the observation that most user interactions with an enterprise application result in one or more respective database transactions (e.g., creating, reading, updating, and/or deleting a database record) that is associated with one or more respective business transactions (e.g., reporting a safety incident, provisioning a new user, entering a new sales order, matching a voucher, etc.). More specifically, performance and/or audit instrumentation present in many enterprise applications monitors such business transactions, and data resulting from the monitoring activities (e.g., audit data 134) can be used to determine one or more sets of game specifications 136.

In some cases, the game specifications 136 describing the gamification of an application can be automatically implemented by the gamification platform described in environment 1B00. In other cases, the game specifications 136 describing the gamification of an application can be implemented by the gamification platform described in environment 1B00 and as specified by an administrator having limited computer skills. A flow for such gamification implementations (e.g., game setup) and associated game play is described in FIG. 1C.

Figure 1C:
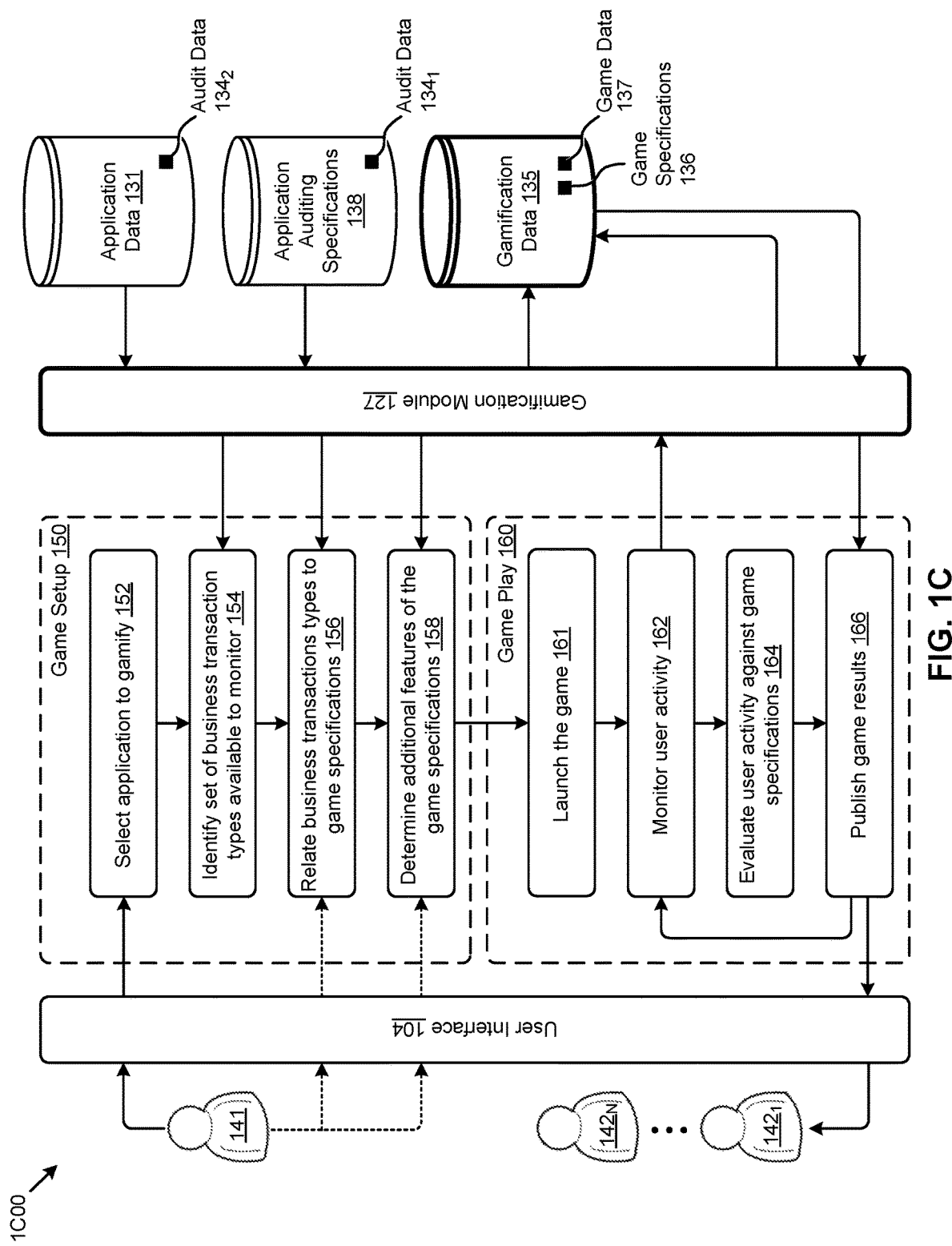
FIG. 1C presents a flow of operations for game setup and game play to implement automatic gamification of enterprise applications using performance and auditing instrumentation, according to some embodiments.

FIG. 1C presents a flow 1C00 of operations for game setup and game play to implement automatic gamification of enterprise applications using performance and auditing instrumentation. As an option, one or more instances of flow 1C00 or any aspect thereof may be implemented in the context of the architecture and functionality of the embodiments described herein. Also, the flow 1C00 or any aspect thereof may be implemented in any desired environment.

The flow 1C00 illustrates a set of operations describing game setup 150 and a set of operations describing game play 160 as related to the automatic gamification of an enterprise application using performance and auditing instrumentation. Specifically, an administrator 141 can interact with the user interface 104 to select an application to gamify (see operation 152). The gamification module 127 can use the audit data as stored in the application auditing specifications 138 (e.g., audit data $134_1$) as stored in application data 131 (e.g., audit data $134_2$), or wherever stored to identify a set of business transaction types available to monitor (see operation 154). The gamification module 127 can further relate the business transaction types to certain game specifications (see operation 156). In some cases, the administrator 141 can also assist in relating the business transaction types to the game specifications. Specific transactions types can be assigned to specific types of business transactions. Strictly as examples, a business transaction type can be typified as a "new transaction", an "update transaction", a "delete transaction", a "read transaction", a "close transaction", etc.

The gamification module 127 can automatically determine additional features of the game specifications (see operation 158). In some cases, the administrator 141 can also assist in determining additional features of the game specifications. When the administrator 141 does not assist with operation 156 and operation 158, the gamification module 127 automatically determines a default set of game specifications to be deployed. Following operation 158, the set of game specifications 136 can be stored in the gamification data 135.

Once the game specifications 136 have been determined, the game can be launched (see operation 161) and user activity associated with interaction with the enterprise application can be monitored (see operation 162) and stored as game data 137 in the gamification data 135. The gamification module 127 can then evaluate the user activity (e.g., game data 137) against the game specifications 136 (see operation 164) to determine and publish game results (see operation 166). Operation 162, operation 164, and operation 166 will loop continuously for the duration of the game. The game results will be presented to a set of one or more users (e.g., user $142_1$, . . . , to user $142_N$) using user interface 104.

As earlier mentioned, in legacy gamification approaches, the game grammar portion of the game specifications can be a complex component to integrate with existing enterprise applications. However, in some embodiments of the herein disclosed techniques, the game specifications can be determined, in part, from the performance and auditing instrumentation present in the enterprise application. An association between the auditing data produced by the auditing instrumentation and game specifications is described in the following FIG. 2A, FIG. 2B, FIG. 2C, and FIG. 2D.

Figure 2A:
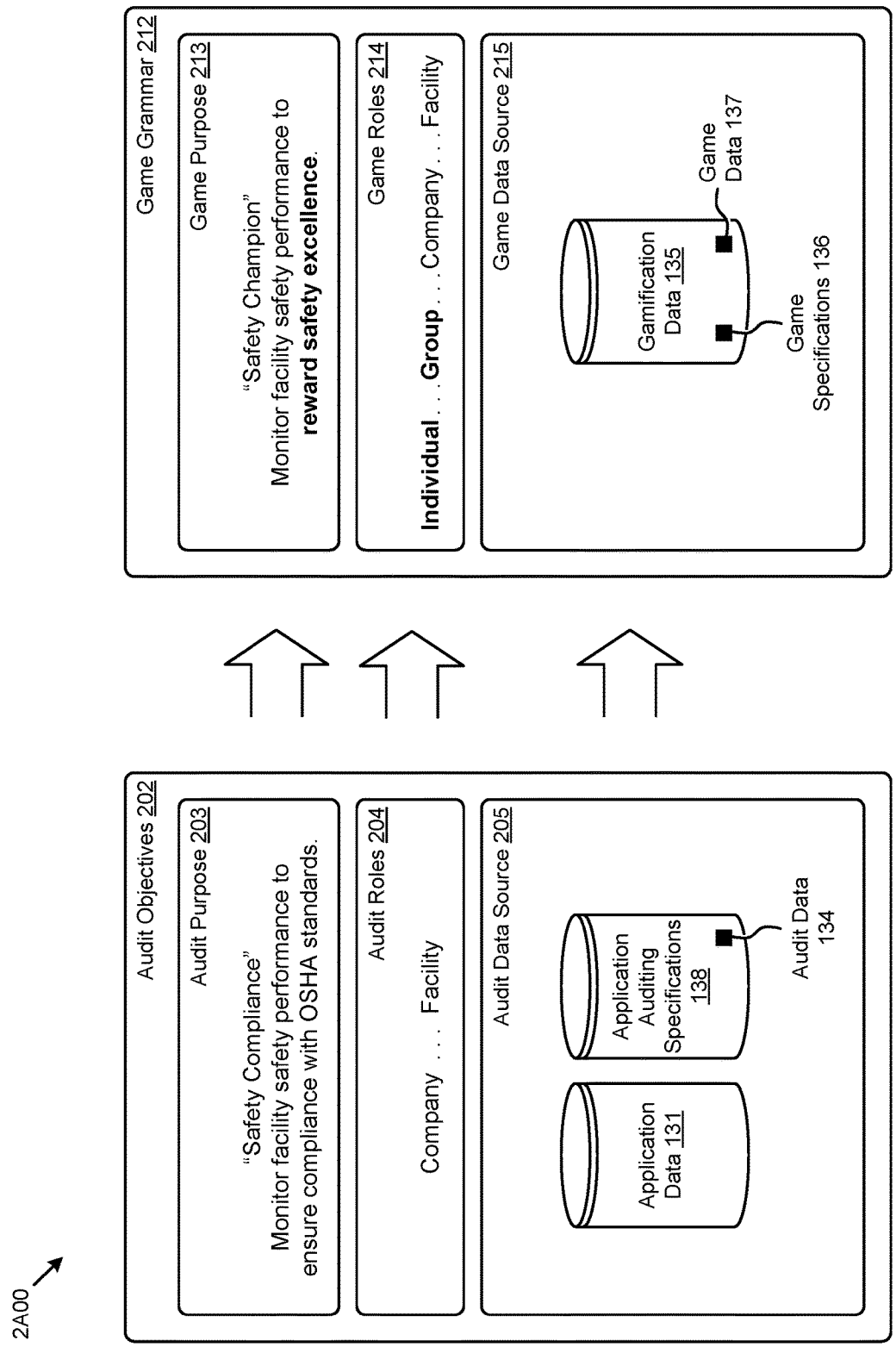
FIG. 2A is a grammar association diagram illustrating an association between auditing data and game grammar.

FIG. 2A is a grammar association diagram 2A00 illustrating an association between auditing data and game grammar. As an option, one or more instances of grammar association diagram 2A00 or any aspect thereof may be implemented in the context of the architecture and functionality of the embodiments described herein. Also, the grammar association diagram 2A00 or any aspect thereof may be implemented in any desired environment.

The grammar association diagram 2A00 shows a set of audit objectives 202 and respective associations to a set of game grammar 212. Specifically, the audit objectives 202 comprises an audit purpose 203, audit roles 204, and an audit data source 205, and the game grammar 212 comprises a game purpose 213, game roles 214, and a game data source 215. The audit purpose 203, for example, can be titled "Safety Compliance" and have "monitor facility safety performance to ensure compliance with Occupational Safety and Health Administration (OSHA) standards." Such an audit purpose 203 can be related to the game purpose 213 with a title of "Safety Champion" and "monitor facility safety performance to reward safety excellence." Further, the audit roles 204 might comprise "Company" and "Facility", whereas the game roles 214 might further comprise "Individual" and "Group". The grammar association diagram 2A00 also shows that the audit data source 205 and the game data source 215 can be the same (e.g., audit data $134_2$ in the store of application data 131). As shown in the example of FIG. 2A, the game grammar 212 of gamification can use the same data as used for the audit objectives 202, but for a more engaging purpose (e.g., see game purpose 213) on a more personal level (e.g., see game roles 214).

Figure 2B:
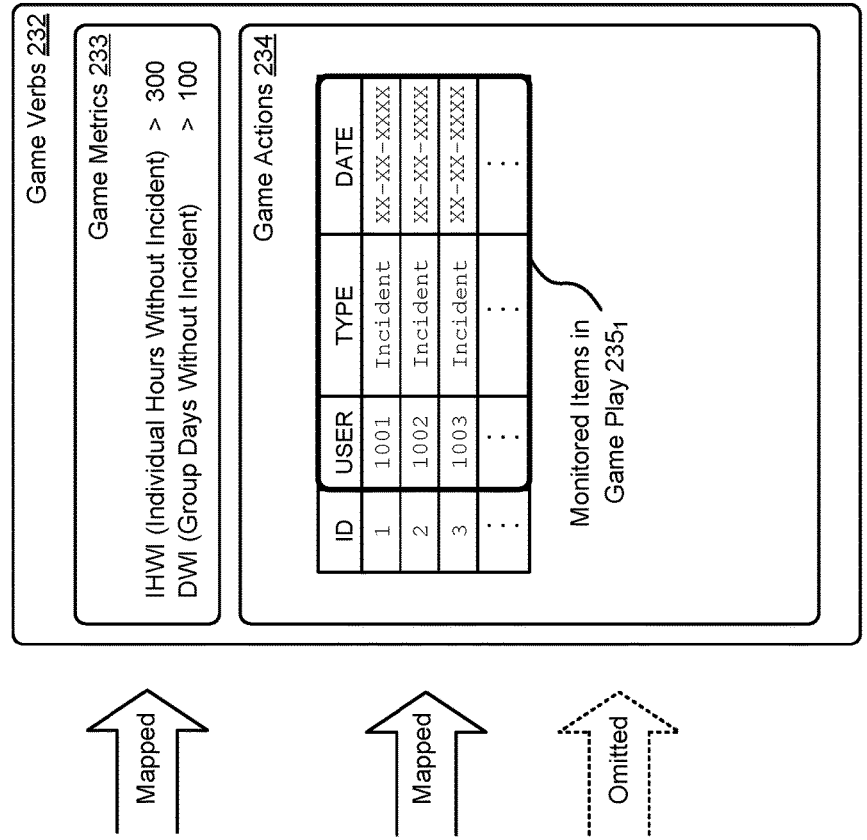
FIG. 2B is a verb association diagram illustrating an association between auditing data and game verbs.
Figure 2B:
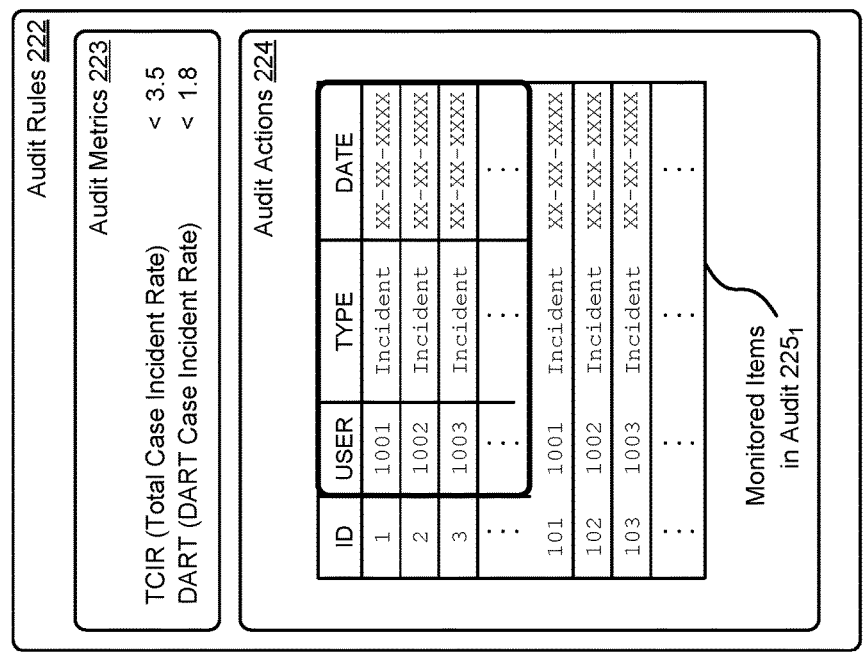

FIG. 2B is a verb association diagram 2B00 illustrating an association between auditing data and game verbs. As an option, one or more instances of verb association diagram 2B00 or any aspect thereof may be implemented in the context of the architecture and functionality of the embodiments described herein. Also, the verb association diagram 2B00 or any aspect thereof may be implemented in any desired environment.

The verb association diagram 2B00 shows a set of audit rules 222 and respective associations to a set of game verbs 232. Specifically, the audit rules 222 comprise audit metrics 223 and audit actions 224, and the game verbs 232 comprises game metrics 233 and game actions 234. The audit metrics 223, for example, can include a total case incident rate (TCIR) with an upper compliance bound of 3.5, and a DART case incident rate (DART) with an upper compliance bound of 1.8, where DART refers to days away from work, job transfer, or restriction. Such audit metrics 223 can be related to the game metrics 233 of individual hours without incident (IHWI) with an individual reward level of 300 hours, and group days without incident (DWI) with a group reward level of 100 days. Further, the audit actions 224 might specify that a certain set of one or more columns in a database table to be monitored (e.g., see monitored items in audit $225_1$) for changes that relate to the audit metrics 223. The game actions 234 might monitor the same certain set of one or more columns in a database table as compared to the audit actions 224, and further monitor other columns (e.g., "USER") for changes that relate to the game metrics 233 (see monitored items in game play $235_1$). In some cases, there may be more audit items being monitored (e.g., see bottom portion of monitored items in audit $225_1$) than are mapped to game metrics 233. For example, audit actions having ID 101 and ID 102 are omitted, whereas audit actions having ID 1, ID 2, and ID are mapped.

Figure 2C:
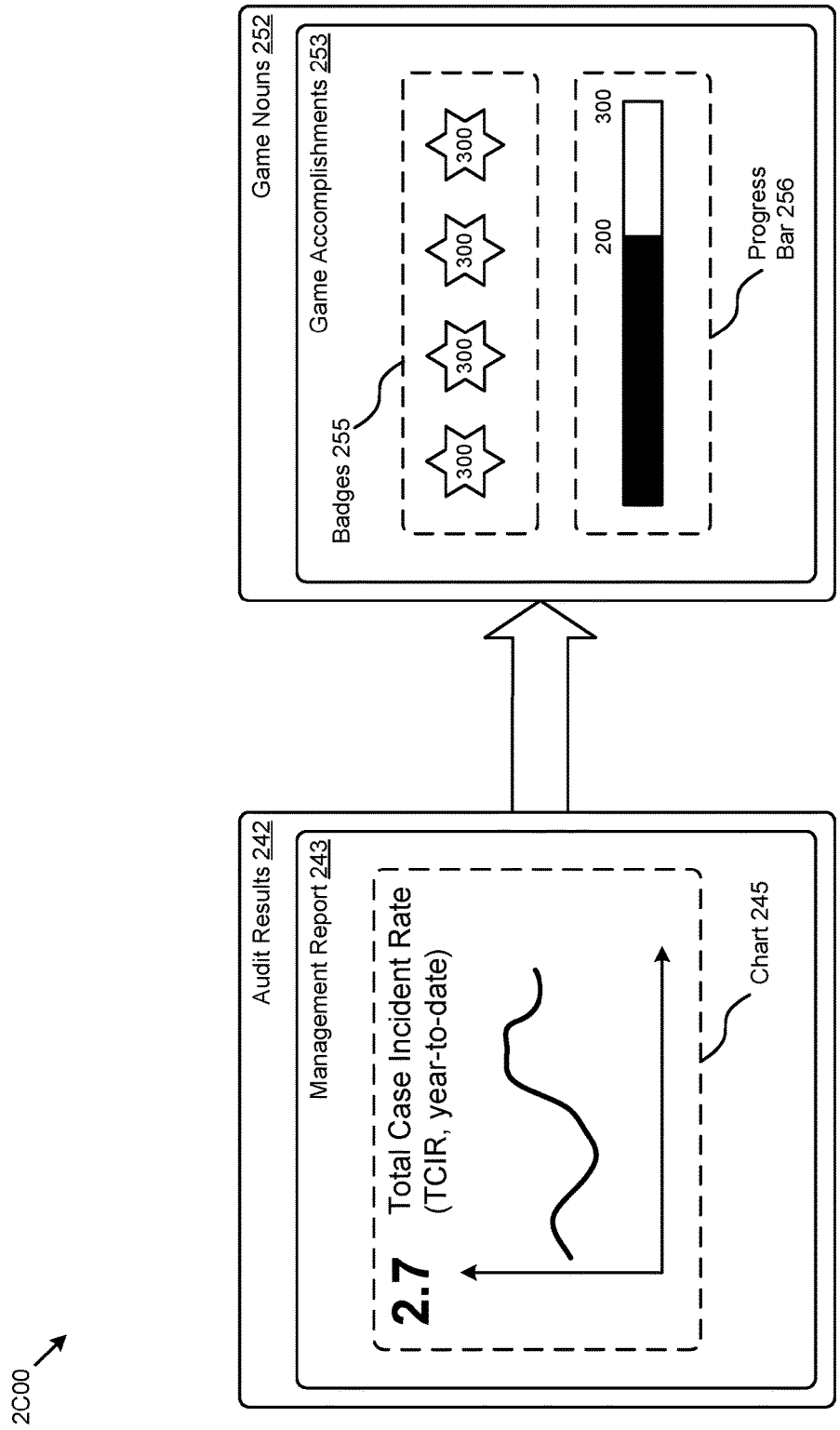
FIG. 2C is a noun association diagram illustrating an association between auditing data and game nouns.

FIG. 2C is a noun association diagram 2C00 illustrating an association between auditing data and game nouns. As an option, one or more instances of noun association diagram 2C00 or any aspect thereof may be implemented in the context of the architecture and functionality of the embodiments described herein. Also, the noun association diagram 2C00 or any aspect thereof may be implemented in any desired environment.

The noun association diagram 2C00 shows a set of audit results 242 and respective associations to a set of game nouns 252. Specifically, the audit results 242 comprise a management report 243, and the game nouns 252 comprise a set of game accomplishments 253. The management report 243, for example, can include a chart 245 showing the results of one or more audit metrics 223 (e.g., TCIR). The game accomplishments 253 can include visual elements such as a set of badges 255 and a progress bar 256 to show a relationship between accomplishments and progress, respectively, related to one or more game metrics 233 (e.g., IHWI). Other visual indicators are also possible (e.g., avatars, leader boards, etc.). In some cases, the game nouns 252 can be provided by third-party gamification platforms.

Figure 2D:
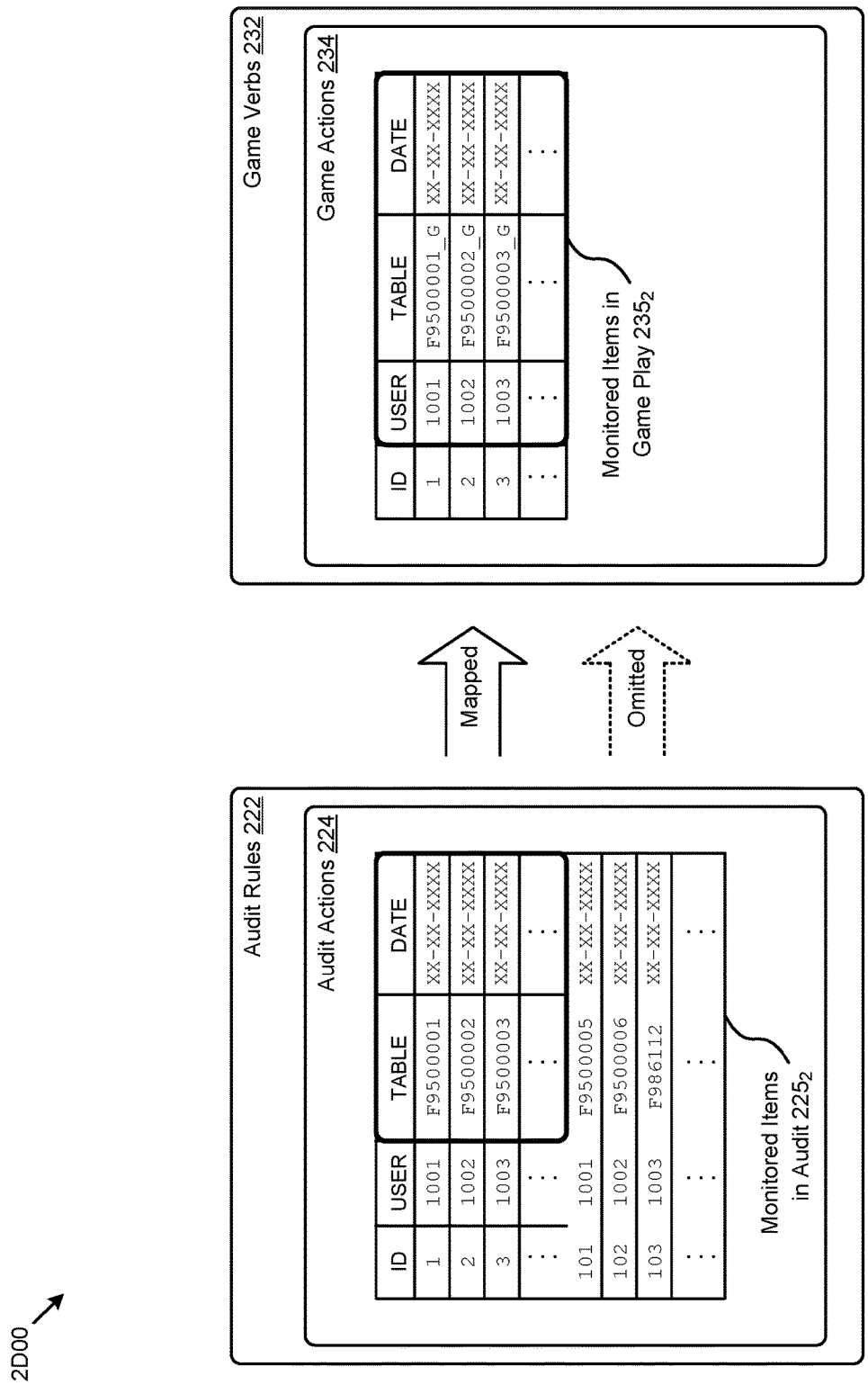
FIG. 2D is an audit action association diagram illustrating a subset of associations between auditing data and game data.

FIG. 2D is an audit action association diagram 2D00 illustrating a subset of associations between auditing data and game data. As an option, one or more instances of audit action association diagram 2D00 or any aspect thereof may be implemented in the context of the architecture and functionality of the embodiments described herein. Also, the audit action association diagram 2D00 or any aspect thereof may be implemented in any desired environment.

As shown, audit action association diagram 2D00 shows a set of audit rules 222 and respective associations to a set of game verbs 232. Specifically, the audit actions 224 can be associated with game actions 234. The audit actions 224, for example, can include any sorts of performance and auditing instrumentation (e.g., time-based observations of actions over database tables), and the actions of such performance and auditing instrumentation can be mapped to associated game actions 234. In this embodiment, the monitored items in audit $225_2$ includes observations based on specific tables (e.g., table F9500001, table F9500002, table F9500003, etc.), Observations can include any sorts of transaction events, for example, the occurrence of a transaction, and/or a time or event recording (e.g., timestamping of database events on the tables) and/or can include parameterized auditing (e.g., comparing values and/or relating aspects of the events to specific roles and/or personnel), etc. As shown, audit actions 224 can be mapped to the game actions 234, however the set of game actions need not include all audit actions. Some audit actions might be omitted from any mappings. As shown, some items within the set of monitored items in audit $225_2$ are omitted from the set of monitored items in game play $235_2$.

As indicated above, monitored items can include, for example, time or event recordings or can include parameterized auditing. Table 1 presents some parameterized auditing examples.

TABLE 1

Parameterized auditing examples

| ID | Audit Action | Audit Mechanism | Comment |
|---|---|---|---|
| 1 | CFR GUID | Trigger | Trigger or rule files to observe access by a particular global user ID (GUID) |
| 2 | Primary Key Columns of Audited Table | Third-party | A third party (e.g., person or software agent) identifies accesses to primary key columns |
| 3 | Before or After | Trigger | An access is audited as being performed at a particular date/time duration before (or after) a specified date/time |
| 4 | Row Action Performed | Trigger | A row is added or deleted |
| 5 | Audited Columns | Third-party | Activity over a set of columns is observed |
| 6 | User ID | Third-party | An observation is made when a user or agent logs in with an assumed role (e.g., changes User ID) |
| 7 | Machine Key | Third-party | The identity of the user device is observed for audit |
| 8 | Date/Time | Trigger | Timestamp events |
| 9 | Program ID | Third-party | An observation is made when a user or agent logs in a credential having an association with a particular Program ID |

Some embodiments take inputs in the form of a data structure that comprises the semantics of the parameterized audit actions of Table 1. A selection of audit actions are considered, and a data structure having semantics of game actions is populated. Strictly as one example, an abstract of a data structure having semantics of game actions is given in Table 2. Note the IDs columns as shown in Table 1 and in Table 2.

TABLE 2

Game action examples

| ID | Game Action | Audit Mechanism |
|---|---|---|
| 3 | Before or After Values | Trigger |
| 4 | Row Action Performed | Trigger |
| 5 | Audited Columns | Third-party |
| 6 | User ID | Third-party |
| 8 | Date/Time | Trigger |

Any form of game actions can be captured in data structures. Some game actions rely on precise event specifications, and the needed precision in event specifications can be captured in an event data structure, some forms of which are presently discussed.

Figure 3A:
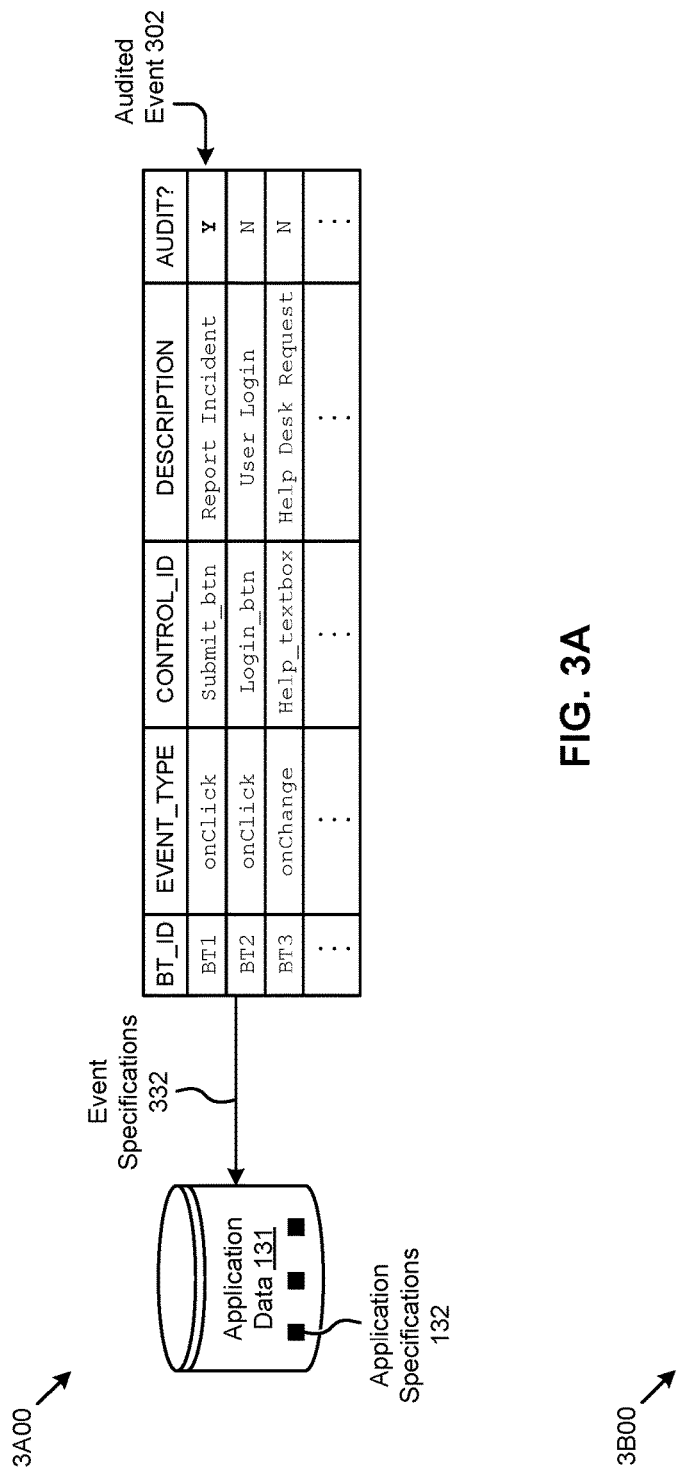
FIG. 3A depicts an event data structure for event specification as implemented in systems for automatic gamification of enterprise applications using performance and auditing instrumentation, according to an embodiment.

FIG. 3A depicts an event data structure 3A00 for event specification as implemented in systems for automatic gamification of enterprise applications using performance and auditing instrumentation. As an option, one or more instances of event data structure 3A00 or any aspect thereof may be implemented in the context of the architecture and functionality of the embodiments described herein. Also, the event data structure 3A00 or any aspect thereof may be implemented in any desired environment.

The event data structure 3A00 shown in FIG. 3A can be used to describe a set of event specifications 332 included in the application specifications 132 and stored in the application data 131. Such event specifications 332 can be used by an enterprise application to associate business transactions to form element events initiated by an application user. For example, a "Submit" button click (e.g., the form element event) initiated by user 101 at user interface 104 in environment 1B00 can be associated with submitting a safety incident report (e.g., the business transaction). Specifically, the event data structure 3A00 comprises a table with multiple columns describing attributes of the event, including: column "BT_ID" describing a unique business transaction identifier; column "EVENT TYPE" describing the form element event; column "CONTROL ID" describing the form element identifier; column "DESCRIPTION" describing the business transaction; and column "AUDIT?" describing whether the respective BT_ID is to be observed or otherwise audited. For example, "BT1" is a "Report Incident" business transaction that is associated with an "onClick" event at button "Submit_btn", and is designated an audited event 302.

Figure 3B:
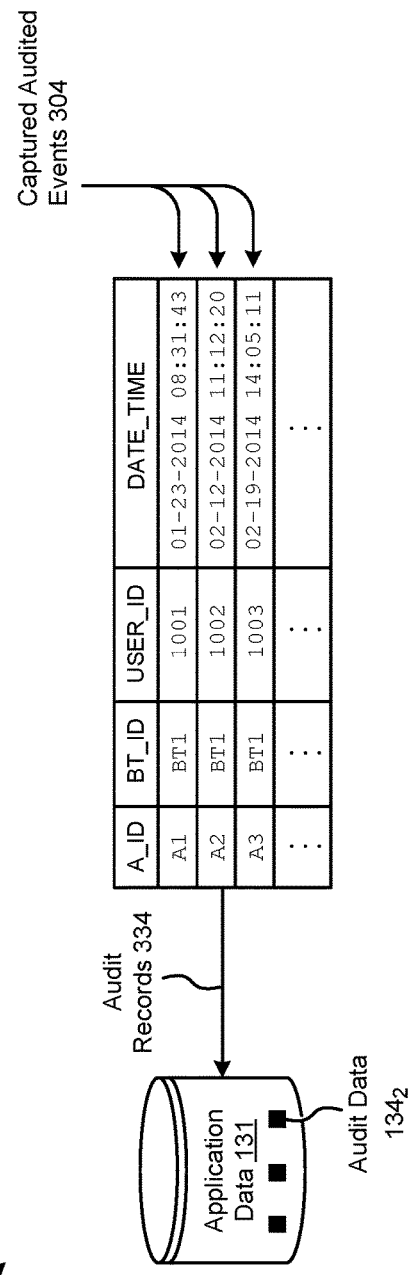
FIG. 3B depicts an audit data structure for audit records as implemented in systems using automatic gamification of enterprise applications using performance and auditing instrumentation, according to an embodiment.

FIG. 3B depicts an audit data structure 3B00 for audit records as implemented in systems using automatic gamification of enterprise applications using performance and auditing instrumentation. As an option, one or more instances of audit data structure 3B00 or any aspect thereof may be implemented in the context of the architecture and functionality of the embodiments described herein. Also, the audit data structure 3B00 or any aspect thereof may be implemented in any desired environment.

Figure 3C:
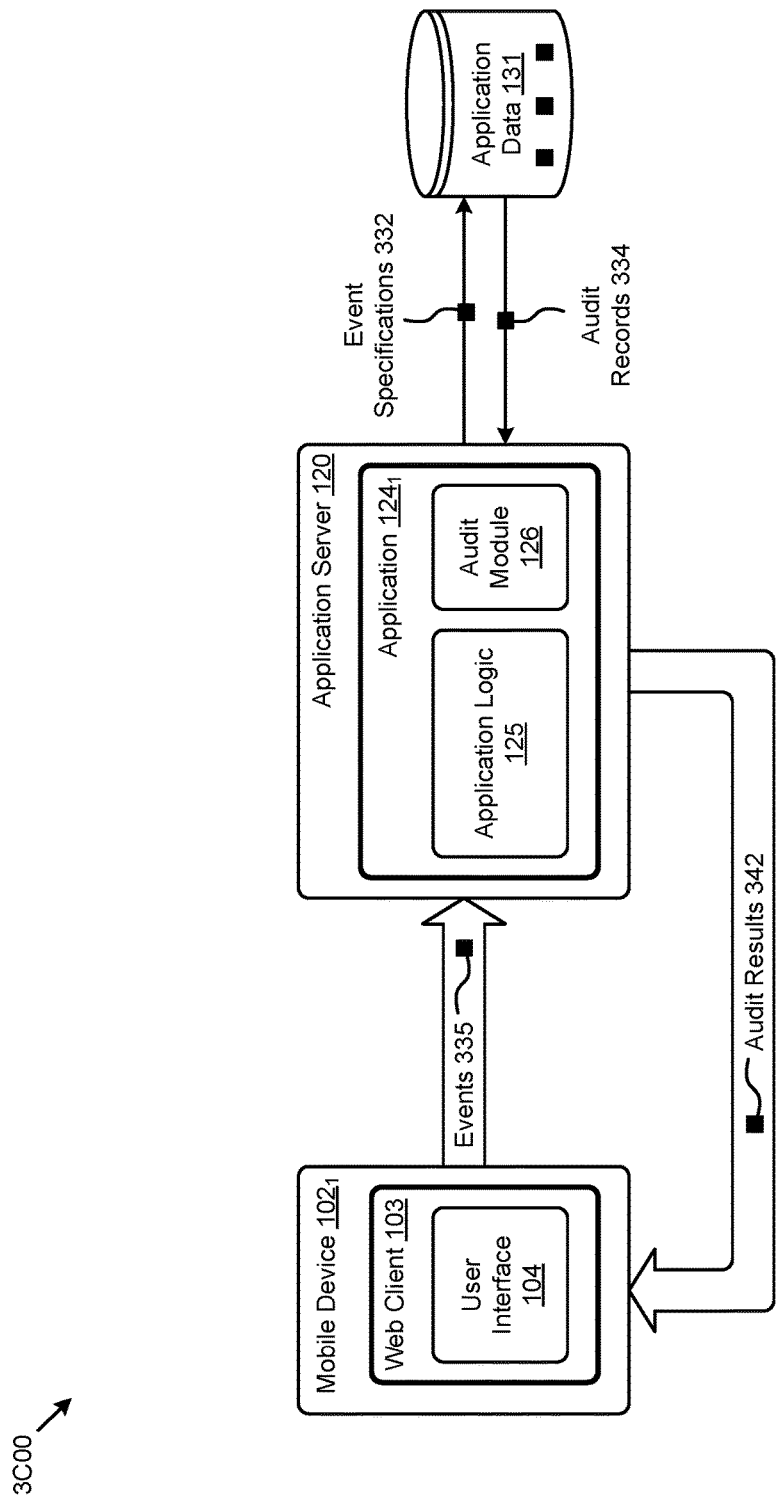
FIG. 3C depicts a logic flow used for auditing business transactions in an environment that supports implementation of automatic gamification of enterprise applications using performance and auditing instrumentation, according to an embodiment.

The audit data structure 3B00 shown in FIG. 3B can be used to describe a set of audit records 334 included in the audit data 134$_2$ and stored in the application data 131. Such audit records 334 can be used by an enterprise application to monitor or track certain business transactions that have been selected for audit (e.g., audited event 302). Specifically, the audit data structure 3B00 comprises a table with multiple columns describing attributes of a set of captured audit events 304, including: column "A_ID" describing a unique audit record identifier; column "BT_ID" describing the business transaction captured; column "USER_ID" describing a unique user identifier of the user who initiated the business transaction; and column "DATE_TIME" describing the date and time when the business transaction occurred. For example, "A1" is a record of business transaction "BT1" (e.g., "Report Incident") initiated by user "1001" at "01-23-2014 08:31:43". FIG. 3C describes how the event data structure 3A00 and the audit data structure 3B00 can be used in a system for auditing business transactions.

FIG. 3C depicts a logic flow 3C00 used for auditing business transactions in an environment that supports implementation of automatic gamification of enterprise applications using performance and auditing instrumentation. As an option, one or more instances of logic flow 3C00 or any aspect thereof may be implemented in the context of the architecture and functionality of the embodiments described herein. Also, the logic flow 3C00 or any aspect thereof may be implemented in any desired environment.

Several components from environment 1A00 are used in FIG. 3C to illustrate the logic flow 3C00 used for auditing business transactions. Specifically, shown in FIG. 3C are mobile device $102_1$, application server 120, and application data 131. Mobile device $102_1$ further comprises web client 103 and user interface 104. Also, application server 120 further comprises application $124_1$, application logic 125, and audit module 126. The logic flow 3C00 can have a stream of events 335 (e.g., business transactions) initiated at the user interface 104 (e.g., via interaction with a user) and sent by the web client 103 to the application $124_1$. The application logic 125 and audit module 126 will process the events 335 according to a set of event specifications 332 (e.g., see FIG. 3A) to generate a stream of audit records 334 to be stored in the application data 131. The data comprising the audit records 334 can be further processed by the audit module 126 to provide a set of audit results 342 (e.g., management report 243) for visual rendering at the user interface 104. The actions of auditing of business transactions (e.g., capture of events 335, storage of audit results 342, etc.) such as is shown in logic flow 3C00 can be used to implement gamification of an enterprise application. Such scenarios are shown and described as pertaining to FIG. 4A and FIG. 4B.

Figure 4A:
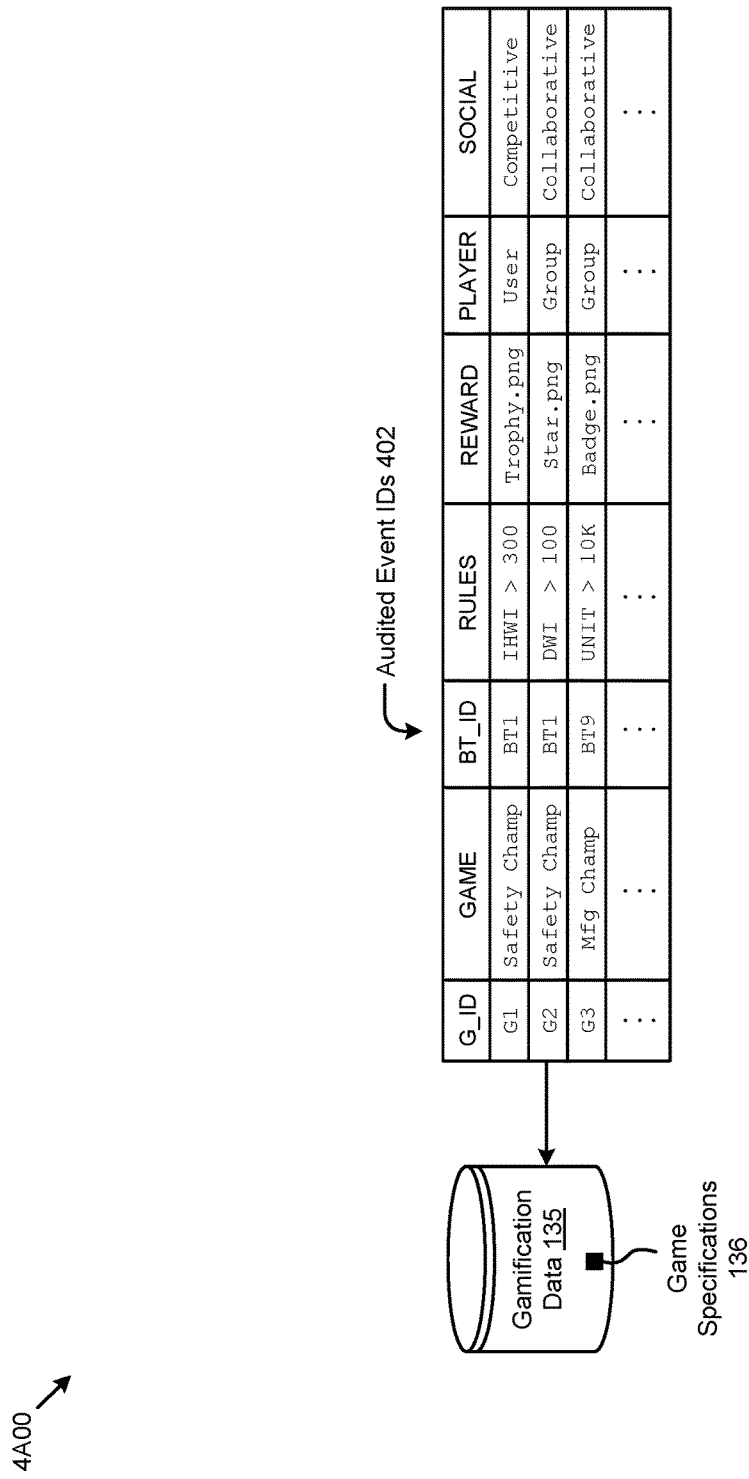
FIG. 4A exemplifies a game data structure for game specifications as implemented in systems using automatic gamification of enterprise applications using performance and auditing instrumentation, according to an embodiment.

FIG. 4A exemplifies a game data structure 4A00 for game specifications as implemented in systems using automatic gamification of enterprise applications using performance and auditing instrumentation. As an option, one or more instances of the game data structure 4A00 or any aspect thereof may be implemented in the context of the architecture and functionality of the embodiments described herein. Also, the game data structure 4A00 or any aspect thereof may be implemented in any desired environment.

Figure 4B:
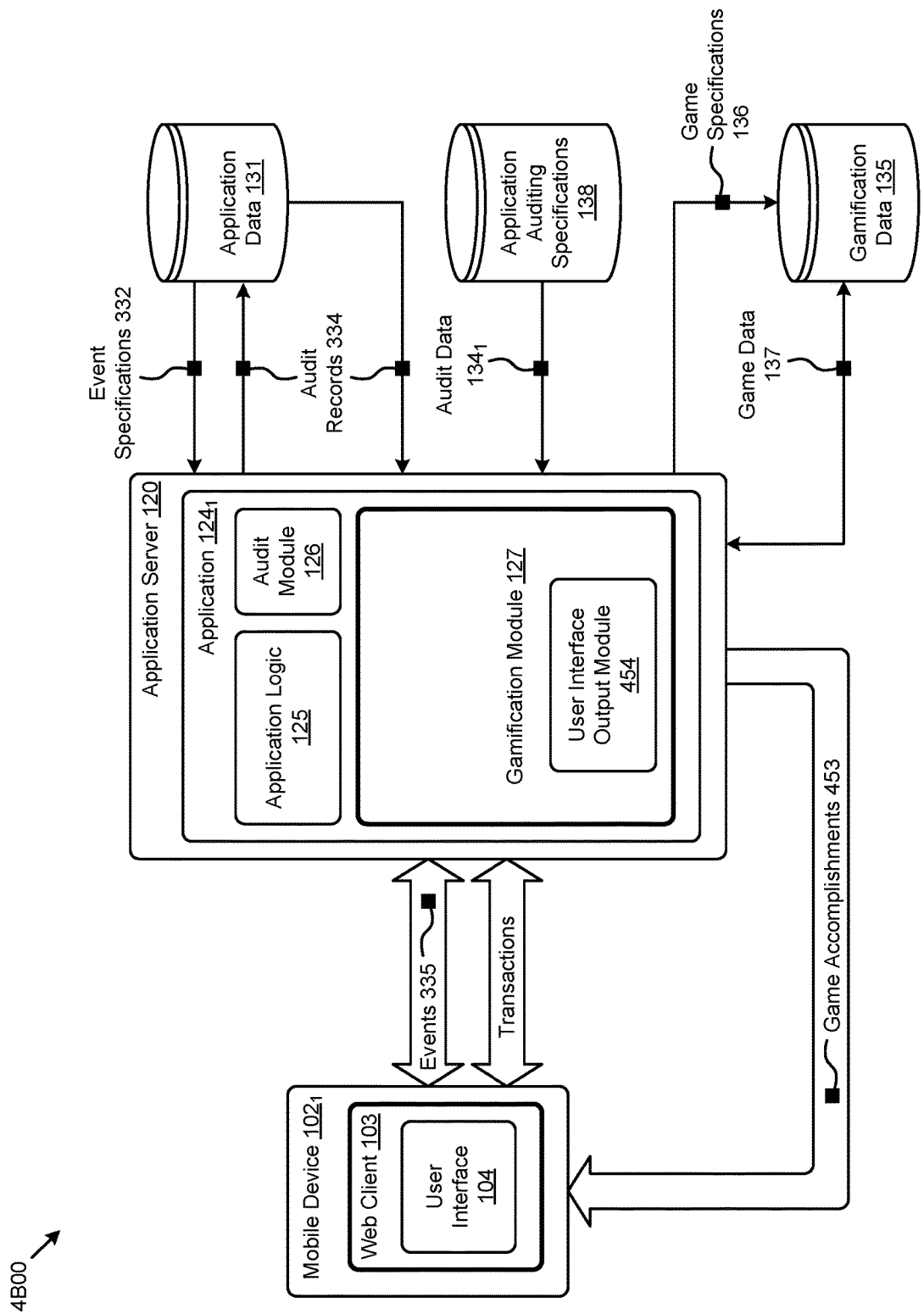
FIG. 4B presents a logic flow used for determining game specifications in systems using automatic gamification of enterprise applications using performance and auditing instrumentation, according to an embodiment.

Automatic gamification of enterprise applications using performance and auditing instrumentation can be enabled, in part, by the game data structure 4A00 shown in FIG. 4A. The game data structure 4A00 can be used to describe various game dynamics included in the game specifications 136 and stored in the gamification data 135. Such game specifications 136 can be used to configure one or more games associated with an enterprise application. Specifically, the game data structure 4A00 can include relational references to one or more audited event IDs 402 to enable automatic gamification of the enterprise applications using performance and auditing instrumentation within the applications. More specifically, the game data structure 4A00 comprises a table with multiple columns describing attributes of the game, including: column "G_ID" describing a unique game identifier; column "GAME" describing the title of the game; column "BT_ID" describing the audited business transaction identifier; column "RULES" describing the rule defining an accomplishment; column "REWARD" describing the item or indicator associated with the accomplishment; column "PLAYER" describing the type of player; and column "SOCIAL" describing the type of social dynamic. For example, "G1" is a "Competitive" "Safety Champ" game associated with the "BT1" business transaction, and rewarding a "User" with a "Trophy.png" visual badge when "IHWI>300" is reached. FIG. 4B describes how the game data structure 4A00 can be used in a system for automatic gamification of enterprise applications using performance and auditing instrumentation.

FIG. 4B presents a logic flow 4B00 used for determining game specifications in systems using automatic gamification of enterprise applications using performance and auditing instrumentation. As an option, one or more instances of logic flow 4B00 or any aspect thereof may be implemented in the context of the architecture and functionality of the embodiments described herein. Also, the logic flow 4B00 or any aspect thereof may be implemented in any desired environment.

The logic flow 4B00 of FIG. 4B comprises the components of logic flow 3C00 of FIG. 3C and additional components to illustrate automatic gamification of enterprise applications using performance and auditing instrumentation. Specifically, FIG. 4B further comprises the gamification module 127 in application $124_1$, and the store of gamification data 135 accessible by application $124_1$. The logic flow can have a stream of events 335 initiated at the user interface 104 (e.g., via interaction with a user) and sent by the web client 103 to the application $124_1$. The application logic 125 and audit module 126 will process the events 335 according to a set of event specifications 332 (e.g., see FIG. 3A) to generate a stream of audit records 334 to be stored in the application data 131. The data comprising the audit records 334 can be further processed by the gamification module 127 to generate a set of game specifications 136 and to store the game specifications 136 in the gamification data 135 (e.g., in a structure such as the game data structure 4A00). The data comprising the game specifications 136 can further be used by the gamification module 127 to gamify the application $124_1$ with one or more games. When the one or more games are launched, the gamification module 127 can continue to monitor the audit records 334 to generate the game data 137 according to the game specifications 136. A user interface output module 454 can generate user interface code (e.g., HTML, Flash, etc.) for visual rendering at the user interface 104 (e.g., to present a set of game accomplishments 453, possibly including a badge 255 and/or a progress bar 256, etc.).

In some cases, the game specifications 136 can be automatically generated (e.g., default specifications) by the gamification platform described herein. In other cases, the game specifications 136 can be generated by the gamification platform with assistance from an administrator (e.g., using the user interface 104 on the web client 103). A flow for such administrator assistance is described in FIG. 5A.

Figure 5A:
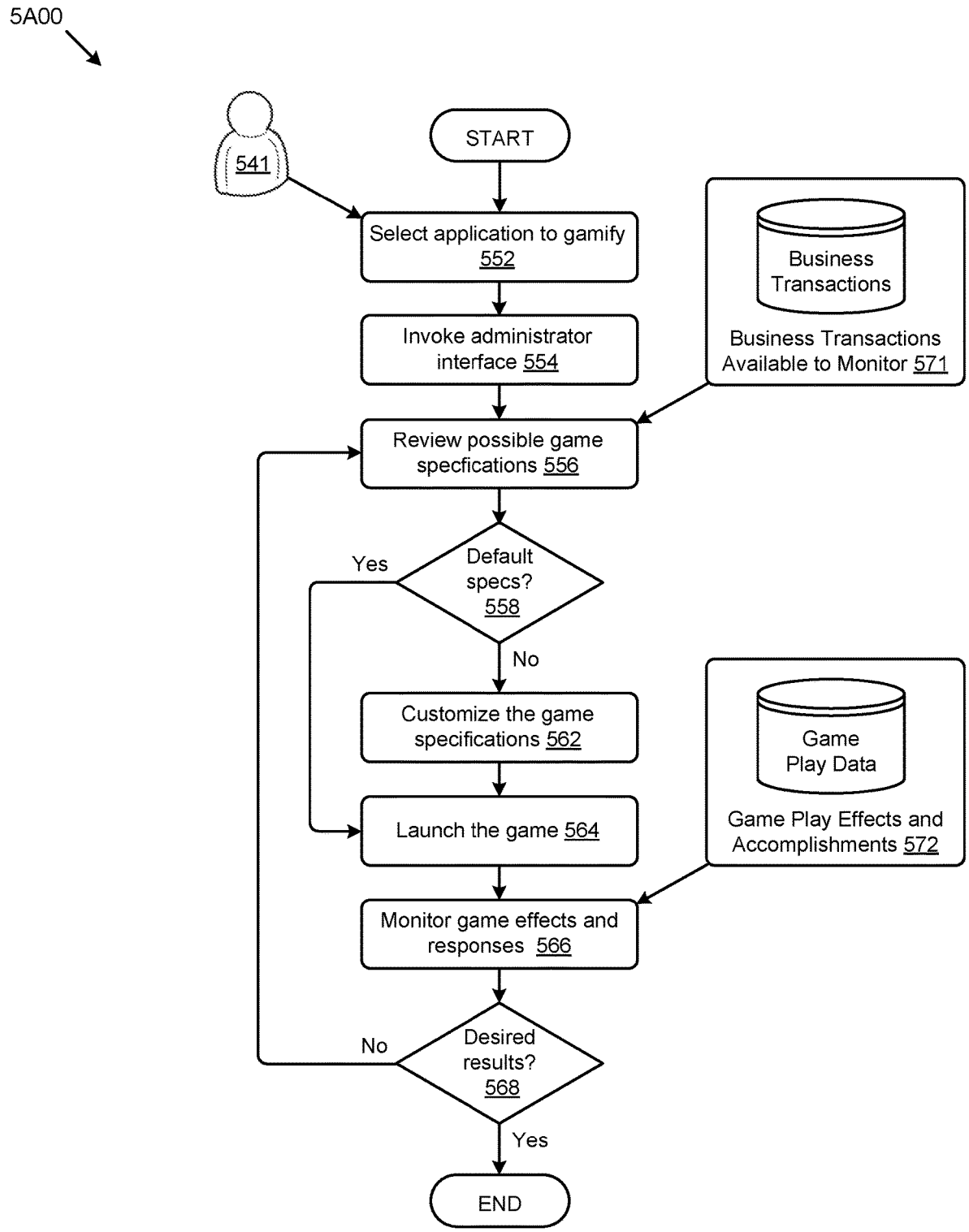
FIG. 5A depicts an operation flow showing a progression of operations executed to determine game specifications in systems using automatic gamification of enterprise applications using performance and auditing instrumentation, according to an embodiment.

FIG. 5A depicts an operation flow 5A00 showing a progression of operations executed to determine game specifications in systems using automatic gamification of enterprise applications using performance and auditing instrumentation. As an option, one or more instances of operation flow 5A00 or any aspect thereof may be implemented in the context of the architecture and functionality of the embodiments described herein. Also, the operation flow 5A00 or any aspect thereof may be implemented in any desired environment.

The operation flow 5A00 starts with an administrator (e.g., administrator 541) selecting an application to gamify (see operation 552). The administrator can then invoke an administrator interface, such as the user interface 104 on web client 103 (see operation 554). The administrator interface can provide various views and elements (e.g., application form elements 105) for interacting with the underlying application, and provide various views and elements (e.g., gamification form elements 106) for enabling the gamification of the application. Using such an administrator interface, the administrator can review the possible game specifications to be used for gamifying the application with one or more games (see operation 556).

As shown in operation flow 5A00, the possible game specifications can be automatically determined by the gamification platform described herein using the business transactions being monitored by the application (see operation 571). The administrator can then decide whether to use the default game specifications determined by the herein disclosed gamification platform (see decision 558) or select a custom set of game specifications from the available criteria provided by the herein disclosed gamification platform (see operation 562). Following selection of either the default game specifications or the custom game specifications, the administrator can launch the game or games (see operation 564) and begin to monitor the game results, effects, and responses (see operation 566). As shown, the game effects and game accomplishment results can be provided by the herein disclosed gamification platform (see operation 572). If the game is providing the desired game results (see decision 568)—such as improvements in engagement, performance, collaboration, etc.—then the game can continue for the specified duration. If, based on the game effects, the game is not producing the desired effects, then the administrator can return to operation 556 to again review the possible game specifications and make adjustments as necessary. Examples and embodiments of administration interfaces for executing the operation flow 5A00 are shown in FIG. 5B and FIG. 5C.

Figure 5B:
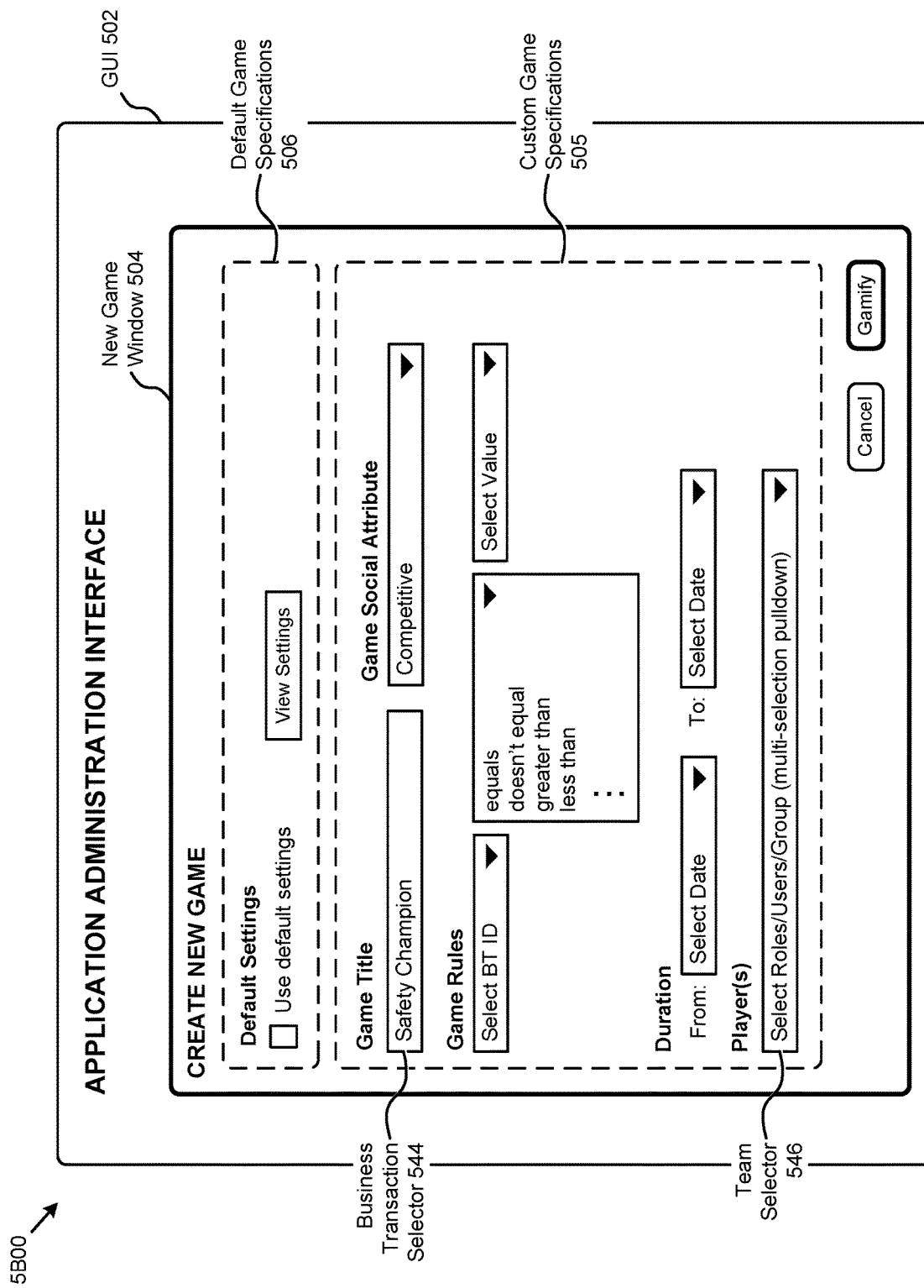
FIG. 5B and FIG. 5C depict administration interfaces for establishing game specifications as implemented in systems using automatic gamification of enterprise applications using performance and auditing instrumentation, according to an embodiment.
Figure 5C:
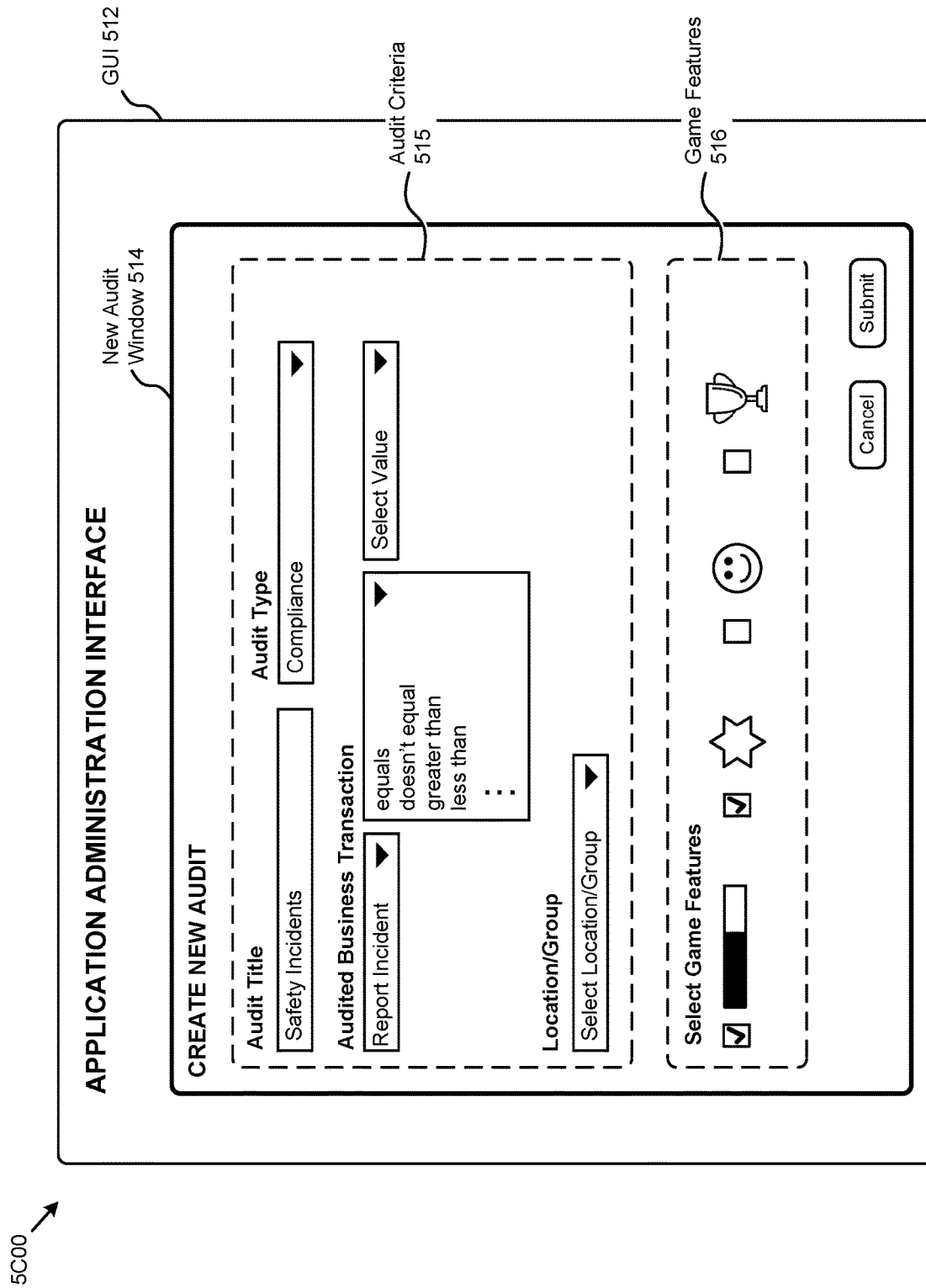

FIG. 5B depicts an administration interface 5B00 for establishing game specifications as implemented in systems using automatic gamification of enterprise applications using performance and auditing instrumentation. As an option, one or more instances of administration interface 5B00 or any aspect thereof may be implemented in the context of the architecture and functionality of the embodiments described herein. Also, the administration interface 5B00 or any aspect thereof may be implemented in any desired environment.

Some embodiments of administration interface 5B00 can be a web-based graphical user interface or new game GUI 502 designed to allow application administrators and others (e.g., team building consultants) to establish game specifications as implemented in systems using automatic gamification of enterprise applications using performance and auditing instrumentation. In some embodiments, such systems described herein can enable an administrator having limited computer usage skills and knowledge of gamification techniques to gamify an application. A new game GUI 502 can be presented to the administrator by a web client (e.g., web client 103) on a computing device (e.g., mobile device $102_1$). In one embodiment, a new game GUI 502 can display various views and elements (e.g., application form elements 105) for interacting with the underlying application (e.g., setting up audit criteria), and can also provide various views and elements (e.g., gamification form elements 106) for enabling the gamification of the application.

Specifically, as shown, new game GUI 502 can display a new game window 504 when the administrator desires to gamify a selected enterprise application. The new game window 504 presents various input entry elements (e.g., dropdown selections, text boxes, etc.) through which the administrator can establish game specifications. More specifically, in one or more embodiments, the administrator can select a set of default game specifications 506 established by the herein disclosed gamification platform. For example, the administrator can simply select the "Use default settings" checkbox and click the "Gamify" button to launch one or more games automatically generated by the herein disclosed gamification platform using the performance and auditing instrumentation of the application (e.g., including audit data 134). The administrator can also establish a set of custom game specifications 505 using one or more of the various input entry elements shown in the administration interface 5B00. For example, the administrator can enter the game title "Safety Champion" and select a game social attribute of "Competitive". A set of game rules can also be established using the input elements shown. For example, the administrator can select a business transaction (e.g., using a business transaction selector 544) to monitor from the choices provided by the gamification system (e.g., see "Select BT_ID") and specify a relationship (e.g., "equals", "doesn't equal", etc.) to a threshold or goal (e.g., see "Select Value") to establish a rule for achieving a certain accomplishment. Other specifications (e.g., duration, player(s), etc.) can also be selected by the administrator using the administration interface 5B00. Strictly as one example, the team selector 546 can be used to bring up another user interface, which in turn facilitates selection of team members based on roles, department, group, or any such selection based on one or more query criteria. As such, in various embodiments, a team-based game can be defined and/or a team can be automatically selected.

When the administrator is satisfied with the game specifications, the "Gamify" button can be clicked and the game specifications 136 can be saved (e.g., in gamification data 135 using the game data structure 4A00) and used by the gamification platform to execute the game. Other types and arrangements of the elements comprising the default game specifications 506 and the custom game specifications 505 are possible. Further, other embodiments of an administrator interface are possible. One such possible embodiment is shown in FIG. 5C.

FIG. 5C depicts an administration interface 5C00 for establishing game specifications as implemented in systems using automatic gamification of enterprise applications using performance and auditing instrumentation. As an option, one or more instances of administration interface 5C00 or any aspect thereof may be implemented in the context of the architecture and functionality of the embodiments described herein. Also, the administration interface 5C00 or any aspect thereof may be implemented in any desired environment.

Some embodiments of administration interface 5C00 can be a web-based graphical user interface or new audit GUI 512 designed to allow audit managers and others to gamify an enterprise application using techniques for automatic gamification of enterprise applications using performance and auditing instrumentation. In some embodiments, such systems described herein can enable an audit manager having limited computer usage skills and knowledge of gamification techniques to gamify an application. A new audit GUI 512 can be presented to the audit manager by a web client (e.g., web client 103) on a computing device (e.g., mobile device $102_1$). In one embodiment, a new audit GUI 512 can display various views and elements (e.g., application form elements 105) for interacting with the underlying application (e.g., setting up audit criteria), and can also provide various views and elements (e.g., gamification form elements 106) for enabling the gamification of the application.

Specifically, as shown, new audit GUI 512 can display a new audit window 514 when the audit manager desires to setup a new business transaction audit. The new audit window 514 presents various input entry elements (e.g., dropdown selections, text boxes, etc.) through which the audit manager can establish a set of audit criteria 515. For example, the audit manager can specify the audit title (e.g., "Safety Incidents"), the audit type (e.g., "Compliance"), the audited business transaction (e.g., "Report Incident"), an audit threshold value (e.g., TCIR less than 3.5), the audited location and/or group, and other criteria. The audit manager can also establish a set of game features 516 associated with the audit criteria 515. For example, the audit manager can select the types of visual indicators to be presented to the users using game graphical user interface display elements during the game (e.g., a progress bar, a star badge, etc.). Other types and arrangements of the elements comprising the audit criteria 515 and the game features 516 are possible. In the embodiments shown in FIG. 5C, when the audit manager clicks the "Submit" button, the herein disclosed gamification platform can enable the setup, launch, and execution of a new game associated with the new audit, including the display of game play status and game effects to the players (e.g., application users). One example of an embodiment of a user interface showing the game play status and effects is shown in FIG. 6A.

Figure 6A:
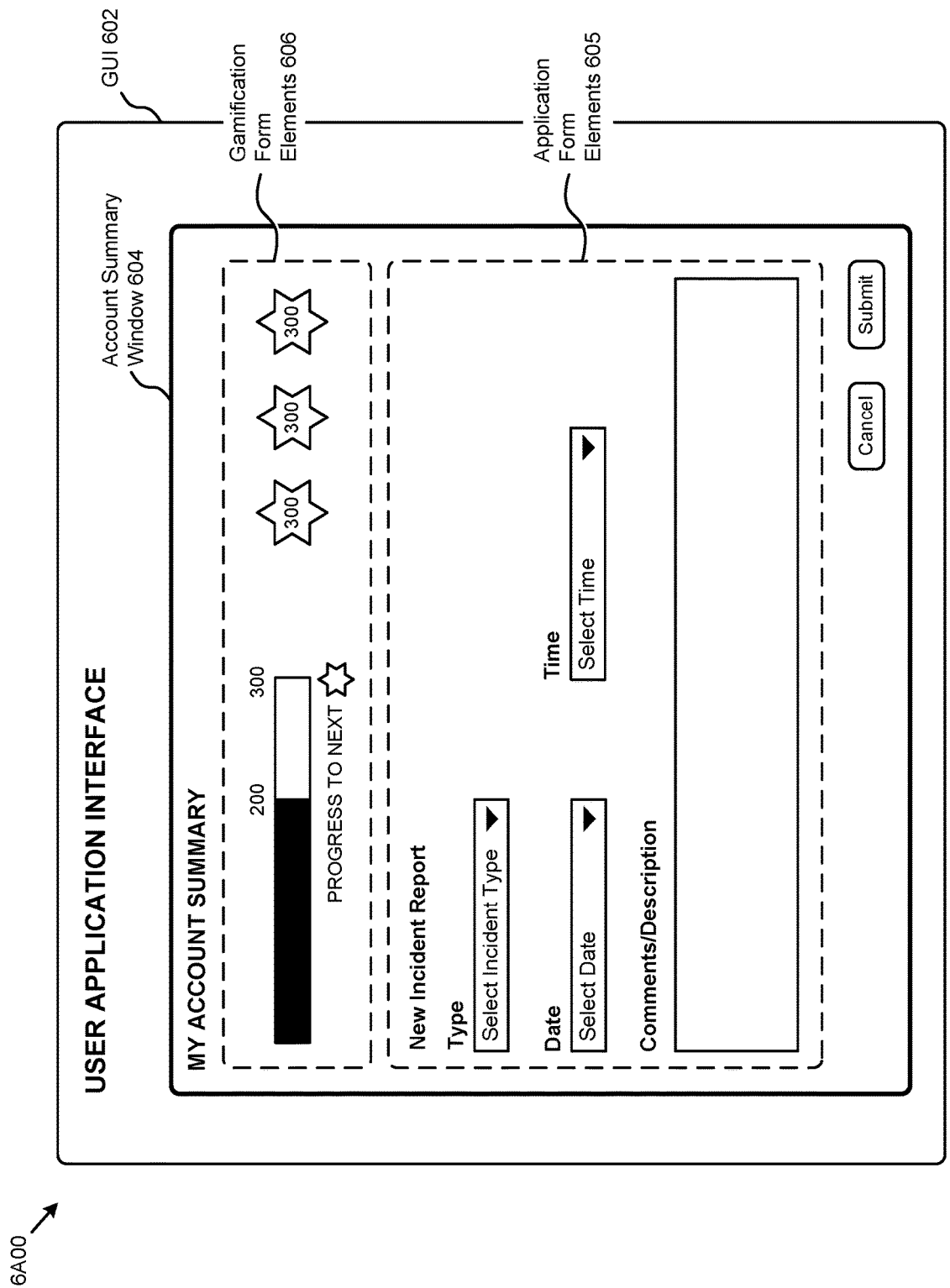
FIG. 6A and FIG. 6B depict user interfaces for rendering visual gamification indicators as implemented in systems using automatic gamification of enterprise applications using performance and auditing instrumentation, according to some embodiments.

FIG. 6A depicts a user interface 6A00 for rendering visual gamification indicators as implemented in systems using automatic gamification of enterprise applications using performance and auditing instrumentation. As an option, one or more instances of user interface 6A00 or any aspect thereof may be implemented in the context of the architecture and functionality of the embodiments described herein. Also, the user interface 6A00 or any aspect thereof may be implemented in any desired environment.

Some embodiments of user interface 6A00 are output by an output module that is configured to produce a web-based graphical user interface screen or summary GUI 602 to be presented to the user by a web client (e.g., web client 103) on a computing device (e.g., mobile device 102$_1$). A summary GUI 602 can display various views and elements (e.g., application form elements 105) that enable the user to interact with the underlying application, and can also provide various views and elements (e.g., gamification form elements 106) to enable the user to interact (e.g., view) with the user's game play status (e.g., progress, effects, accomplishments, etc.).

Specifically, as shown, summary GUI 602 can display an account summary window 604 when the user first logs into and/or navigates to the user's summary view. As shown, the account summary window 604 displays a set of application form elements 605 through which the user can perform various tasks associated with the enterprise application (e.g., submit a new incident report). The account summary window 604 also displays a set of gamification form elements 606 that enable the user to view the user's game play status and results. For example, the user can see that three 300-hour incident free badges have been awarded, and that 200 hours of progress has been made towards another 300-hour incident free badge. Other types and arrangements of the application form elements 605 and the gamification form elements 606 are possible.

Figure 6B:
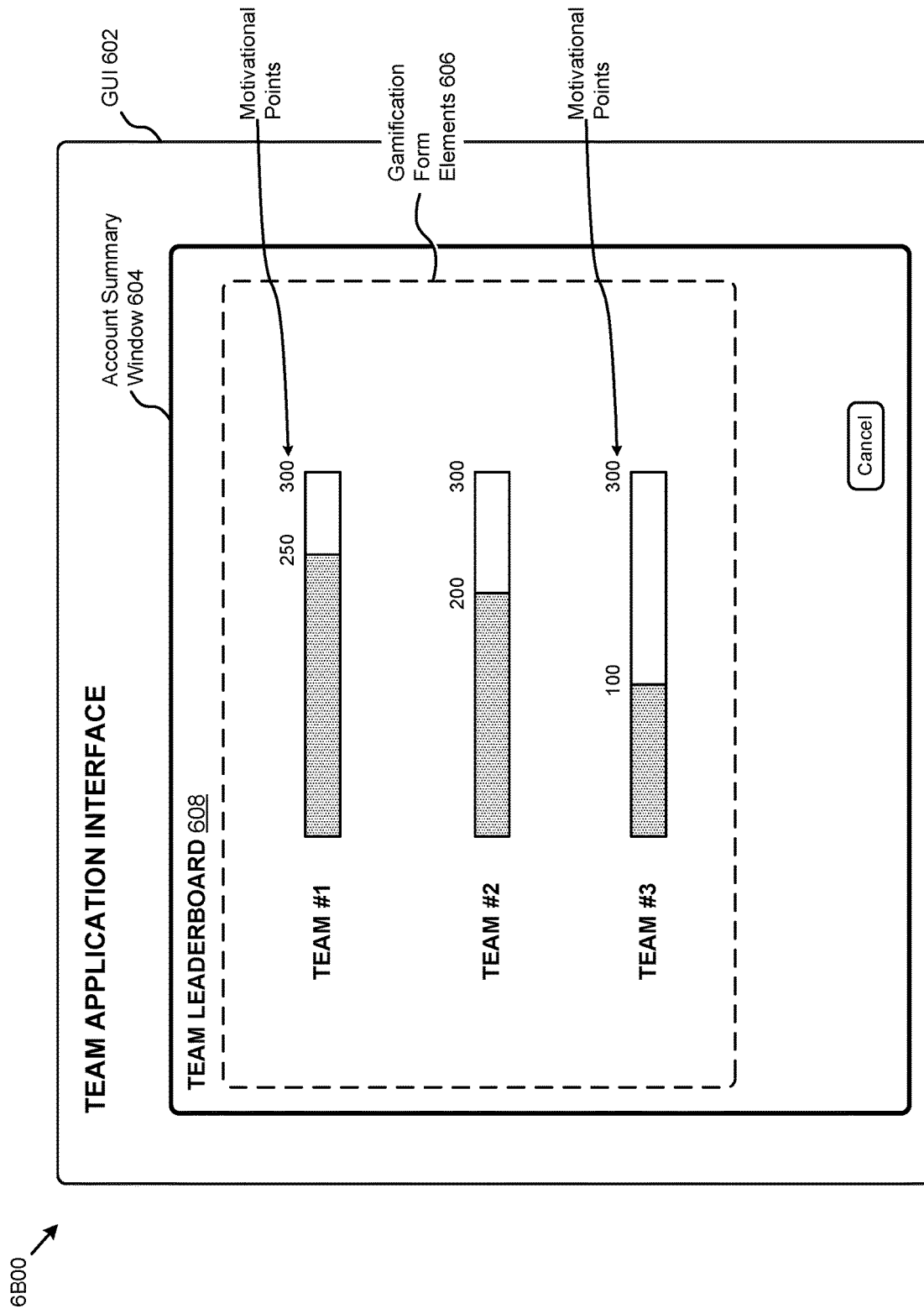

FIG. 6B depicts a user interface 6B00 for rendering visual gamification indicators as implemented in systems using automatic gamification of enterprise applications using performance and auditing instrumentation. As an option, one or more instances of user interface 6B00 or any aspect thereof may be implemented in the context of the architecture and functionality of the embodiments described herein. Also, the user interface 6B00 or any aspect thereof may be implemented in any desired environment.

As shown, the user interface 6B00 depicts a team leaderboard 608, which in turn shows a plurality of top teams, together with respective scores and goals. The shown user interface 6B00 is merely one example, and other forms of leaderboards and/or other motivational imagery can be presented. In the case that the game verbs apply to team constructions and/or to competitive or collaborative dynamics (e.g., see FIG. 4A), links to social sites might be provided, and the content at such social sites can be customized to facilitate team competition and/or team collaboration.

In addition to the aforementioned techniques for facilitating team competition and/or team collaboration, motivational scoring can be implemented to facilitate team competition and/or team collaboration. Furthermore, team competition and/or team collaboration can be fostered by implementing scoring approaches that derive from business-oriented metrics. Some techniques for using business metrics to implement motivational scoring are discussed hereunder.

Figure 6C:
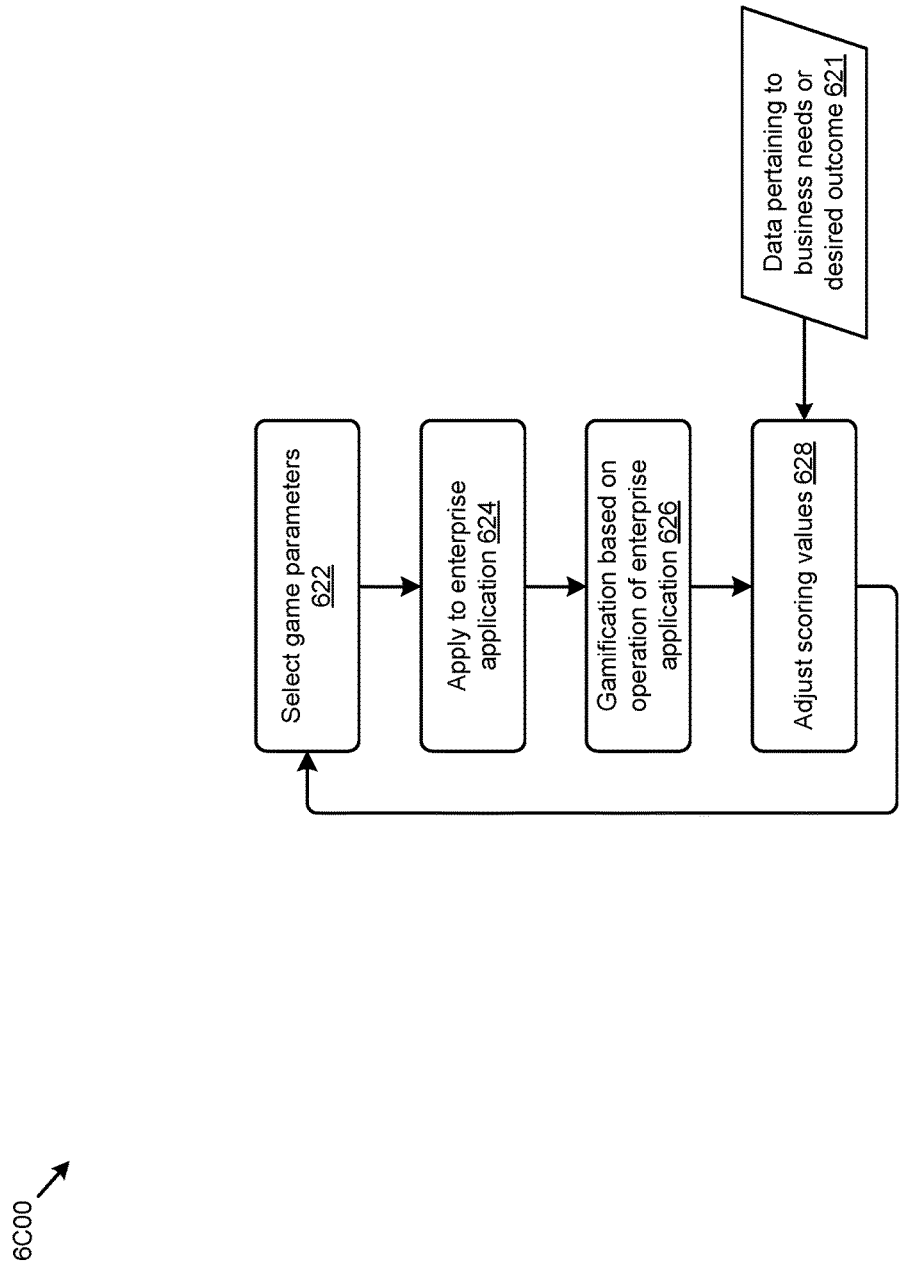
FIG. 6C is a flowchart of an approach to implement business-oriented motivational scoring, according to an embodiment.

FIG. 6C is a flowchart 6C00 of an approach to implement business-oriented motivational scoring. At step 622, game parameters (e.g., game parameters selected from game specifications 136) are selected. For example, game parameters and respective motivational imagery such as scoreboards, badges, awards, and/or leaderboards may be selected and configured in this step. Next, at step 624, the motivational semantics (e.g., achieve highest quarterly sales revenue) of the motivational imagery are associated with variables in an enterprise application. Tasks and activities are associated with these game parameters such that participants gain motivational points and badges by completing such tasks and performing activities.

At step 626, gamification-based operation of the enterprise application commences. Activities performed by the users are tied to the operation of the game's motivational imagery. As work is performed by workers, motivational points are awarded to those workers as reflected on scoreboards and leaderboards. For example, when a person enters data for a sale (e.g., to increase sales revenue for the quarter) the transactional log retrieves the sale data. At some point, the events or conditions may suggest an adjustment of the absolute or relative point scoring of the different activities (e.g., see step 628). This adjustment may be performed to change the absolute point values awarded to the activities, or may instead change relative point values of the different activities. For example, as the quarter progresses, it may be deemed more desirable to post sales revenue for ProductA rather than ProductB. Accordingly, the motivational points awarded for one unit of ProductA sales revenue may be assigned a higher point value than would be awarded for one unit of ProductB sales revenue. Such a change may be based upon data retrieved or derived inputs that regard the business' needs or desires for particular business outcomes and results (e.g., see inputs 621). The changes are propagated to reconfigure the gamification parameters, and the process loops back to continue gamification-based operation of the enterprise application.

In some embodiments, the change to the scoring is performed using an adaptive component that analyzes the current state of various metrics in the system, including the current state of events or conditions that may suggest an adjustment of the absolute or relative point scoring, and automatically adjusts the scoring based at least in part upon analysis of the metrics. A rules engine can be used to implement the adaptive scoring component, where a set of rules is configured to provide adjustments to the scoring based on a set of conditions placed into the rules. Periodic checks can be performed as to the status of the various metrics of interest, and the rules engine identifies whether any condition exists that rises to the level of performing an adjustment to the game scoring. If so, then an action module would interface with the motivational imagery to automatically adjust the scoring using settings (e.g., point values) given in respective rules.

Additional Embodiments of the Disclosure

Additional Practical Application Examples

Figure 7:
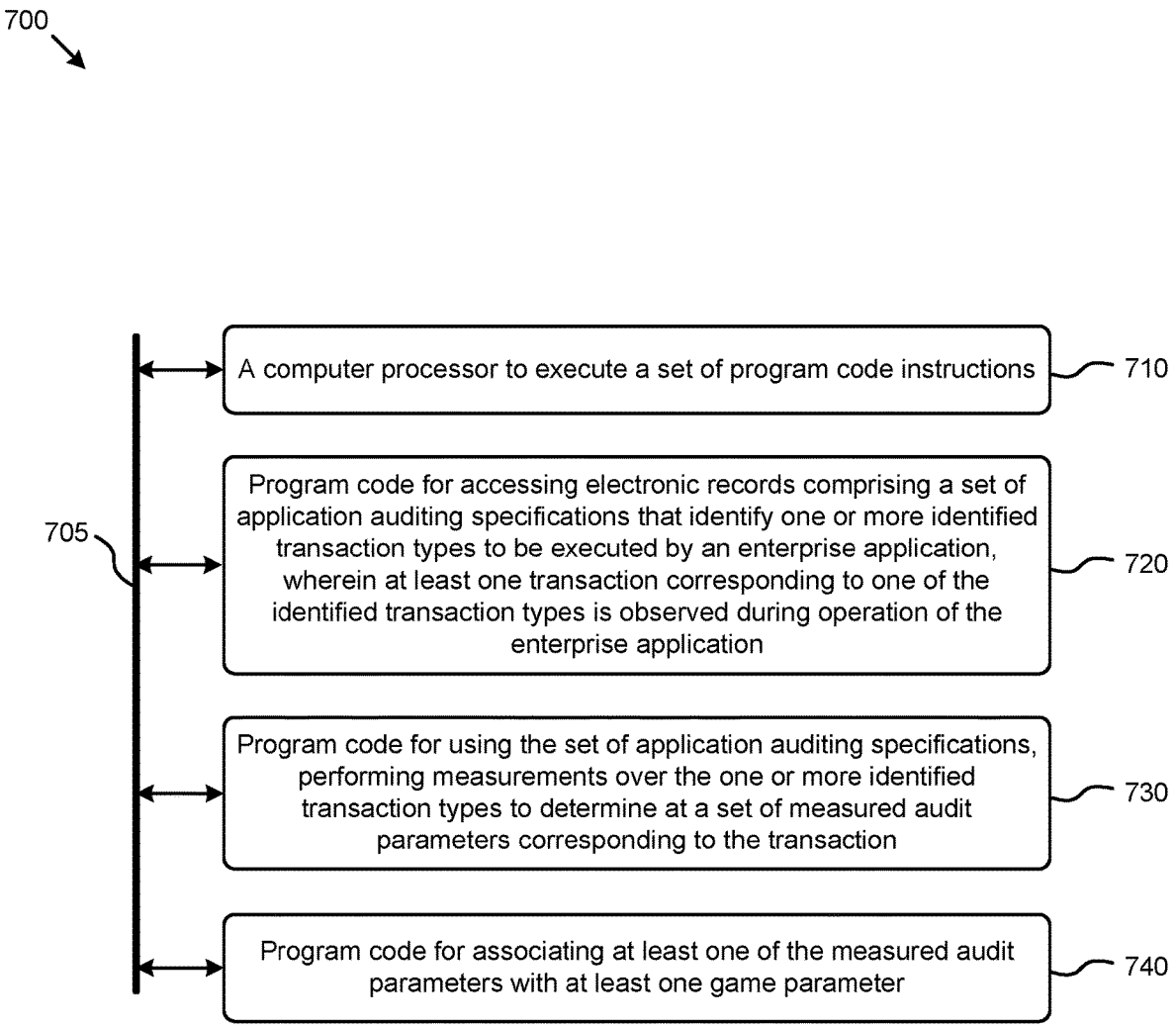
FIG. 7 depicts a system as an arrangement of computing modules that are interconnected so as to operate cooperatively to implement any of the herein-disclosed embodiments.

FIG. 7 depicts a system as an arrangement of computing modules that are interconnected so as to operate cooperatively to implement any of the herein-disclosed embodiments. The partitioning of 700 is merely illustrative and other partitions are possible. As an option, the present system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (see module 710) and modules for accessing memory to hold program code instructions to perform: accessing electronic records comprising a set of application auditing specifications that identify one or more identified transaction types to be executed by an enterprise application, wherein at least one transaction corresponding to one of the identified transaction types is observed during operation of the enterprise application (see module 720); using the set of application auditing specifications and performing measurements over the one or more identified transaction types to determine a set of measured audit parameters corresponding to the transaction types (see module 730); and associating at least one of the measured audit parameters with at least one game parameter (see module 740).

System Architecture Overview

Additional System Architecture Examples

Figure 8A:
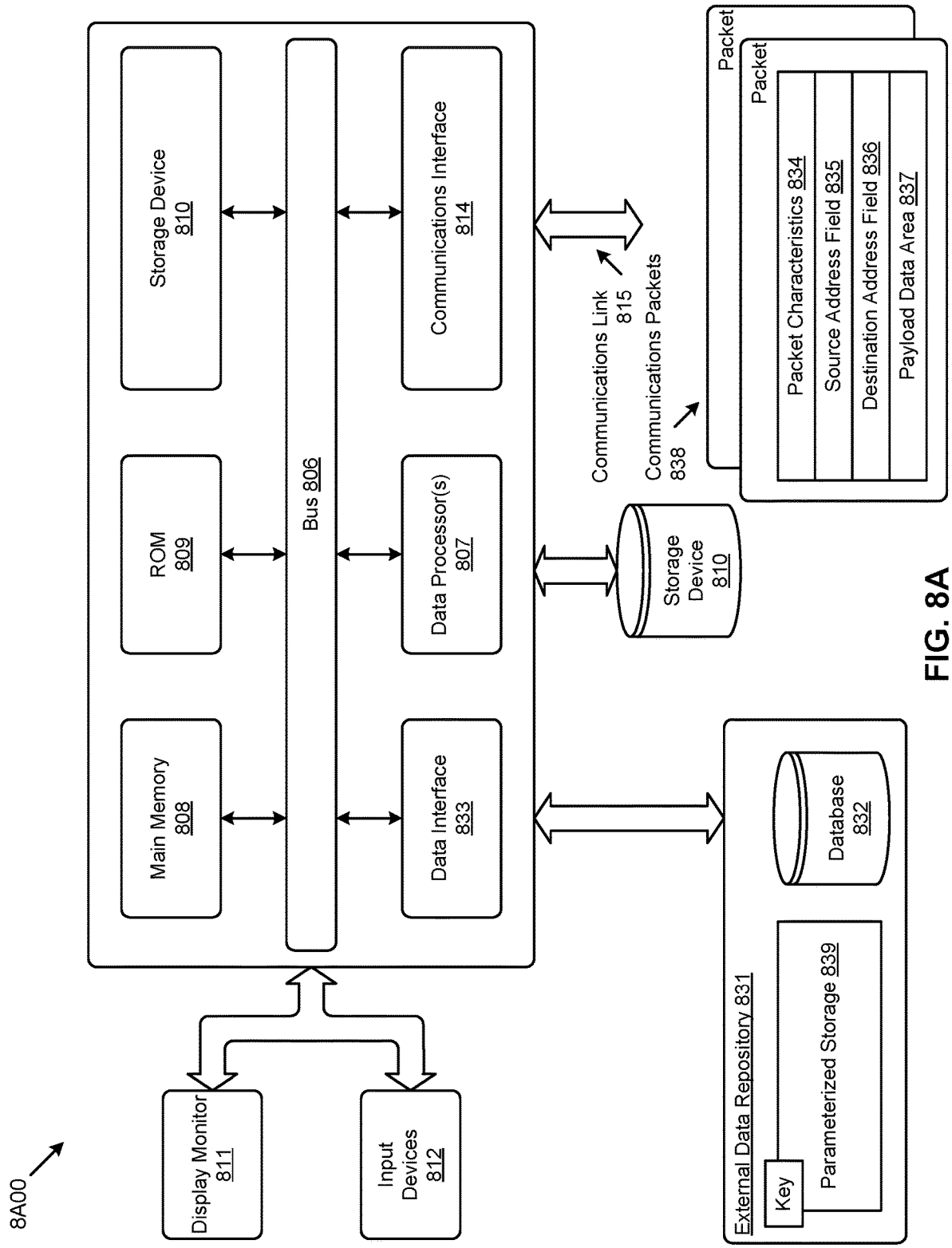
FIG. 8A, FIG. 8B, and FIG. 8C depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or port thereto can be configured differently from any other particular instance. Portions of a communication protocol can be carried out in whole or in part by any instance of the communication interface 814, and data (e.g., packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configured to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The partition 8A01 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of automatic gamification of enterprise applications using performance and auditing instrumentation.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of automatic gamification of enterprise applications using performance and auditing instrumentation). Such files or records can be brought into and/or stored in volatile or non-volatile memory.

Figure 8B:
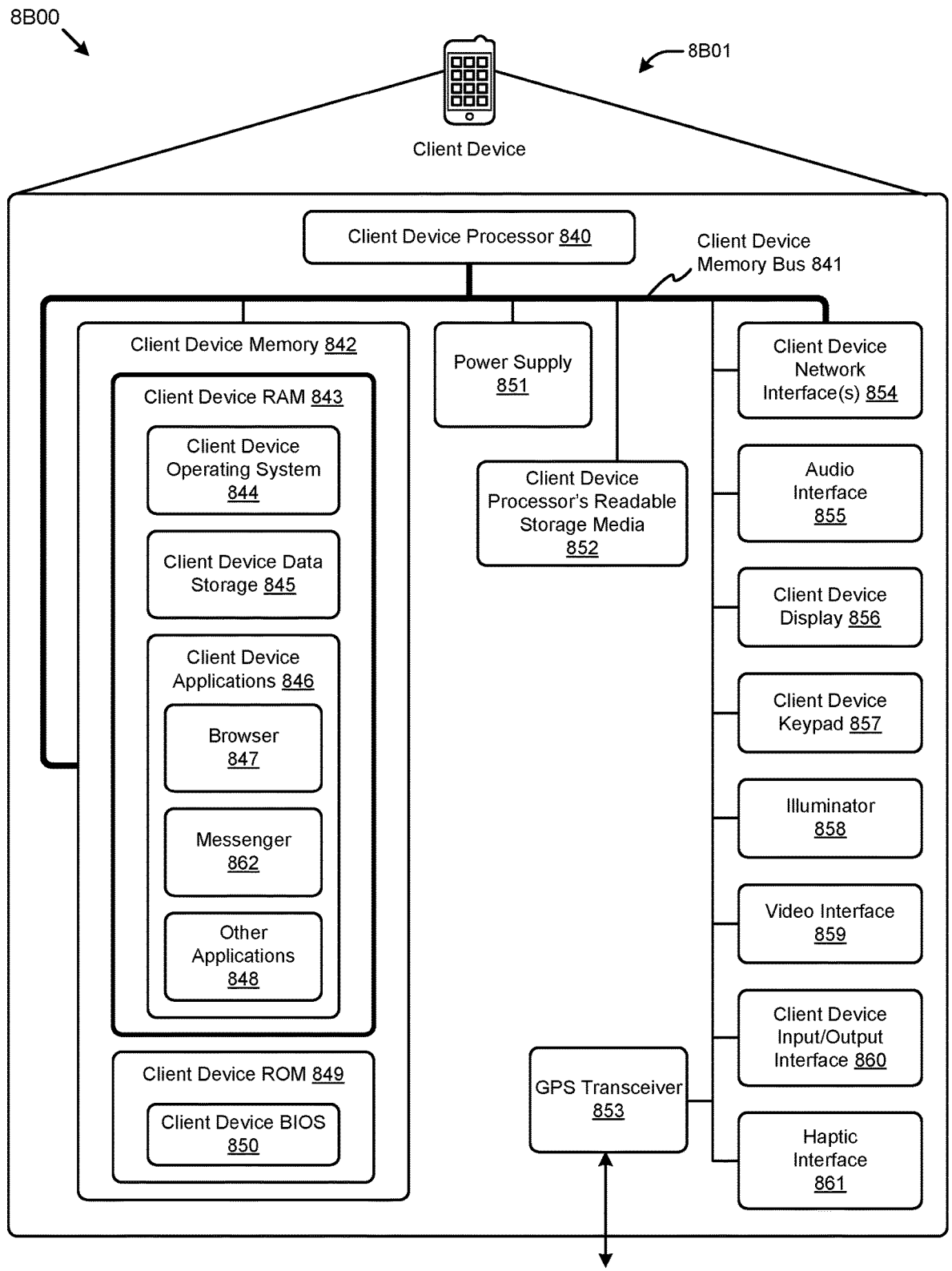

FIG. 8B depicts a block diagram 8B00 of an instance of a client device 8B01 that may be included in a system implementing instances of the herein-disclosed embodiments. Client device 8B01 may include many more or fewer components than those shown in FIG. 8B. Client device 8B01 may represent, for example, an embodiment of at least one of client devices as heretofore disclosed.

As shown in the figure, client device 8B01 includes a client device processor 840 in communication with a client device memory 842 via a client device memory bus 841. Client device 8B01 also includes a power supply 851, one or more client device network interfaces 854, an audio interface 855, a client device display 856, a client device keypad 857, an illuminator 858, a video interface 859, a client device 10 interface 860, a haptic interface 861, and a GPS transceiver 853 for global positioning services.

The power supply 851 provides power to client device 8B01. A rechargeable or non-rechargeable battery may be used to provide power. The power may also be provided by an external power source such as an AC adapter or a powered docking cradle that supplements and/or recharges a battery.

A client device 8B01 may optionally communicate with a base station, or directly with another computing device. A client device network interface 854 includes circuitry for coupling a client device 8B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 854 is sometimes known as a transceiver, a transceiving device, or a network interface card (NIC).

An audio interface 855 is arranged to produce and receive audio signals such as the sound of a human voice. For example, audio interface 855 may be coupled to a speaker and microphone to enable telecommunication with others and/or generate an audio acknowledgement for some action.

A client device display 856 may be a liquid crystal display (LCD), gas plasma, light emitting diode (LED), or any other type of display used with a computing device. A client device display 856 may also include a touch sensitive screen arranged to receive input from an object such as a stylus or a digit from a human hand.

A client device keypad 857 may comprise any input device arranged to receive input from a user. For example, client device keypad 857 may include a push button numeric dial, or a keyboard. A client device keypad 857 may also include command buttons that are associated with selecting and sending images.

An illuminator 858 may provide a status indication and/or provide light. Illuminator 858 may remain active for specific periods of time or in response to events. For example, when the illuminator 858 is active, it may backlight the buttons on client device keypad 857 and stay on while the client device is powered. Also, the illuminator 858 may backlight these buttons in various patterns when particular actions are performed such as dialing another client device. An illuminator 858 may also cause light sources positioned within a transparent or translucent case of the client device to illuminate in response to actions.

A video interface 859 is arranged to capture video images such as a still photo, a video segment, an infrared video or the like. For example, the video interface 859 may be coupled to a digital video camera, a web-camera or the like. A video interface 859 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 8B01 comprise a client device IO interface 860 for communicating with external devices such as a headset, or other input or output devices not shown in FIG. 8B. The client device IO interface 860 can use one or more communication technologies such as a USB, infrared, Bluetooth™ port or the like. A haptic interface 861 is arranged to as a human interface device (HID) to facilitate interaction with a user of a client device. Such interaction can include tactile feedback to a user of the client device. For example, the haptic interface 861 may be employed to cause vibration of the client device 8B01 in a particular way (e.g., with a pattern or periodicity) and/or when interacting with one or another user.

A GPS transceiver 853 can determine the physical coordinates of client device 8B01 on the surface of the Earth. The GPS transceiver 853, in some embodiments, may be optional. The shown GPS transceiver 853 outputs a location such as a latitude value and a longitude value. However, the GPS transceiver 853 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 8B01 on the surface of the Earth. It is understood that under different conditions, a GPS transceiver 853 can determine a physical location within millimeters for client device 8B01; and in other cases, the determined physical location may be less precise such as within a meter or significantly greater distances. In certain embodiments, the client device 8B01 may provide other information that may be employed to determine a physical location of the device including, for example, a media access control (MAC) address, IP address, IP port identifier, or the like.

The client device memory 842 includes random access memory 843, read-only memory 849, and other storage means. The client device memory 842 illustrates an example of computer readable storage media (devices) for storage of information such as computer readable instructions, data structures, program modules or other data. The client device memory 842 stores a basic IO system (BIOS) in the embodiment of client device BIOS 850 for controlling low-level operation of client device 8B01. The memory also stores an operating system 844 for controlling the operation of client device 8B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

The client device memory 842 further includes one or more instances of client device data storage 845, which can be used by client device 8B01 to store, among other things, client device applications 846 and/or other data. For example, client device data storage 845 may also be employed to store information that describes various capabilities of client device 8B01. The information may then be provided to another device based on any of a variety of events including being sent as part of a header during a communication, sent upon request or the like. Client device data storage 845 may also be employed to store social networking information including address books, buddy lists, aliases, user profile information or the like. Further, client device data storage 845 may also store messages, web page content, or any of a variety of content (e.g., received content, user generated content, etc.).

At least a portion of the information may also be stored on any component or network device including, but not limited, to a client device processor's readable storage media 852, a disk drive or other computer readable storage devices within client device 8B01, etc.

An instance of a client device processor's readable storage media 852 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 852 may also be referred to herein as computer readable storage media.

The client device applications 846 may include computer executable instructions which, when executed by client device 8B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 846 may include, for example, a messenger 862, a browser 847, and other applications 848. Certain other applications 848 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 848 may collect and store user data that may be received from other computing devices in the environment.

A messenger 862 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 862 may be configured as an IM application such as AOL (America Online) instant messenger, Yahoo! messenger, .NET messenger server, ICQ or the like. In certain embodiments, the messenger 862 may be configured to include a mail user agent (MUA) such as Elm, Pine, message handling (MH), Outlook, Eudora, Mac Mail, Mozilla Thunderbird or the like. In another embodiment, the messenger 862 may be a client device application that is configured to integrate and employ a variety of messaging protocols including, but not limited, to various push and/or pull mechanisms for client device 8B01. In certain embodiments, the messenger 862 may interact with the browser 847 for managing messages. As used herein, the term "message" refers to any of a variety of messaging formats, or communications form including, but not limited to, email, SMS, IM, MMS, IRC or the like.

A browser 847 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 847 may enable a user of client device 8B01 to communicate with another network device as may be present in the environment.

Figure 8C:
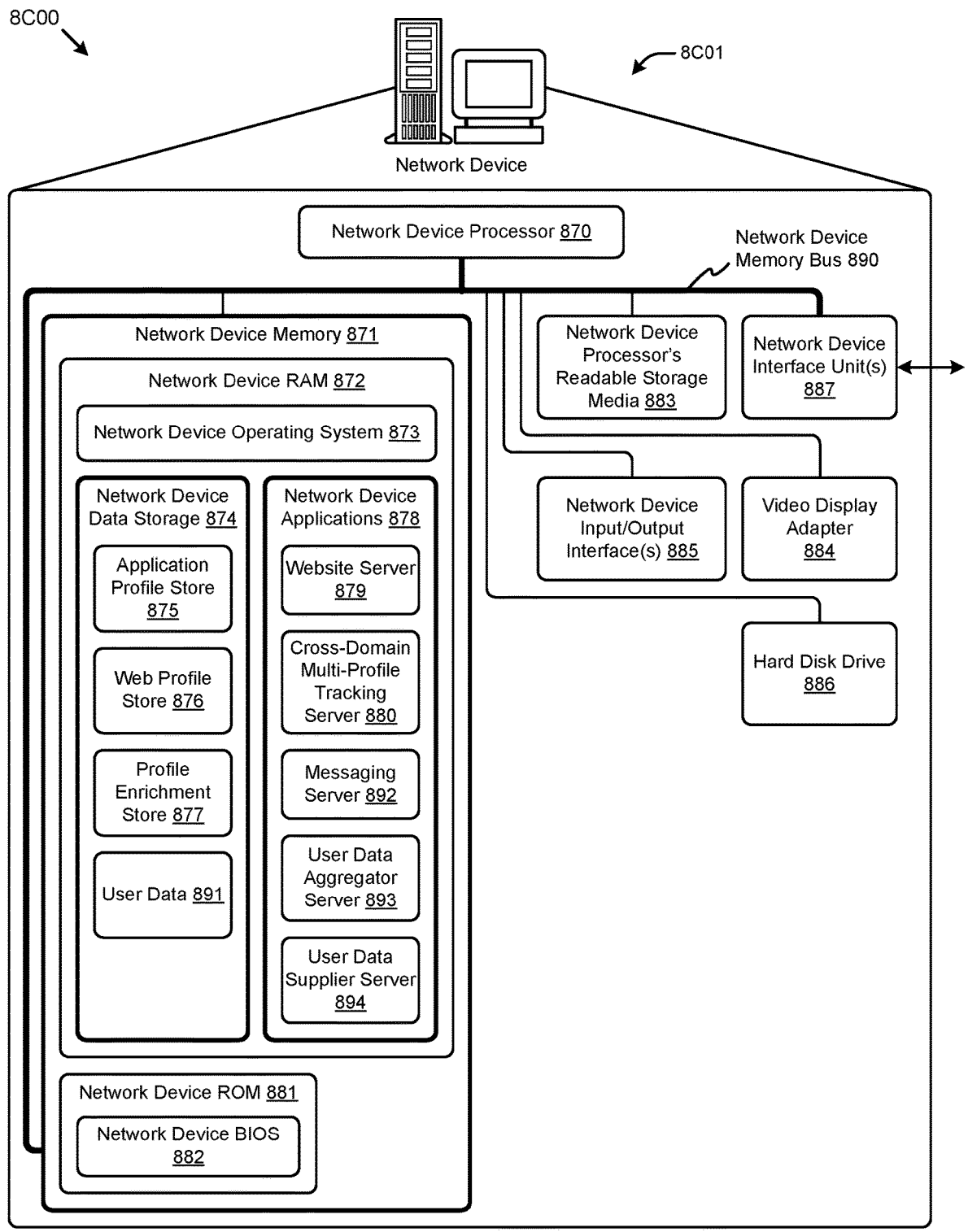

FIG. 8C depicts a block diagram 8C00 of an instance of a network device 8C01 that may be included in a system implementing instances of the herein-disclosed embodiments. Network device 8C01 may include many more or fewer components than those shown. Network device 8C01 may be configured to operate as a server, client, peer, a host, or any other device.

The network device 8C01 includes at least one instance of a network device processor 870, instances of readable storage media 883, network interface(s) 887, a network device 10 interface 885, a hard disk drive 886, a video display adapter 884, and a network device memory 871, all in communication with each other via a network device memory bus 890. The network device memory generally includes network device RAM 872, network device ROM 881. Some embodiments include one or more non-volatile mass storage devices such as a hard disk drive 886, a tape drive, an optical drive, and/or a floppy disk drive. The network device memory stores a network device operating system 873 for controlling the operation of network device 8C01. Any general-purpose operating system may be employed. A basic input/output system (BIOS) is also provided in the form of network device BIOS 882 for controlling the low-level operation of network device 8C01. As illustrated in FIG. 8C, a network device 8C01 also can communicate with the Internet, or some other communications network, via a network interface unit 887, which is constructed for use with various communication protocols including the TCP/IP protocol. The network interface unit 887 is sometimes known as a transceiver, a transceiving device, or a network interface card (NIC). Network device 8C01 also comprises a network device IO interface 885 for communicating with external devices such as a keyboard or other input or output devices. A network device IO interface 885 can use one or more communication technologies such as USB, infrared, Bluetooth™ or the like.

The storage devices as described above may use various types of computer readable media, namely non-volatile computer readable storage media and/or a client device processor's readable storage media 883 and/or a network device processor's readable storage media 883. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 874 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 874 may further include program code, data, algorithms and the like, for use by a processor such as a network device processor 870 to execute and perform actions. In certain embodiments, at least some of the logical contents of network device data storage 874 might be stored on another component of network device 8C01, such as on a second instance of hard disk drive 886 or on an external/removable storage device.

The network device data storage 874 may further store any portions of application data and/or user data such as an application profile store 875, a web profile store 876, a profile enrichment store 877 and/or any user data collected. In some embodiments, user data 891 may store unique user data, non-unique user data, aggregated user data, and/or any combination thereof. User data 891 may include a variety of attributes such as a five digit zip code, an expanded nine digit zip code and the like.

The Network device data storage 874 may also store program code and data. One or more network device applications 878 may be loaded into network device data storage or any other mass memory, to be accessible to run with or as a part of network device operating system 873. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 892, website server 879, user data aggregator server 893, a cross-domain multi-profile tracking server 880, and/or user data supplier server 894 may also be included within or implemented as application programs.

A messaging server 892 may include virtually any computing component or components configured and arranged to forward messages from message user agents and/or other message servers, or to deliver messages to a local message store such as network device data storage 874 or the like. Thus, a messaging server 892 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 892 may also be managed by one or more components of the messaging server 892. Thus, the messaging server 892 may also be configured to manage SMS messages; IM, MMS, IRC, or RSS feeds; mIRC; or any of a variety of other message types. In certain embodiments, the messaging server 892 may enable users to initiate and/or otherwise conduct chat sessions, VOIP sessions or the like.

A website server 879 may represent any of a variety of information and services that are configured to provide content, including messages, over a network to another computing device. Thus, a website server 879 can include, for example, a web server, a file transfer protocol (FTP)

server, a database server, a content server or the like. A website server 879 may provide the content including messages over the network using any of a variety of formats including, but not limited to WAP, HDML, WML, SGML, HTML, XML, compact HTML (cHTML), extensible HTML (xHTML) or the like. A website server 879 may also be configured to enable a user of a client device to browse websites, upload user data, view and interact with advertisements or the like.

A user data aggregator server 893 is configured to aggregate user data to be provided to user data buyers for advertising campaigns. In certain embodiments, a user data aggregator server 893 may be configured to receive collected user data from a user data supplier server 894. In some embodiments, a user data aggregator server 893 may receive a query for user data. Based on the query, a user data aggregator server 893 may generate a plurality of subsets of aggregated user data. In some embodiments, user data aggregator server 893 may be included in a network device.

A user data supplier server 894 is configured to collect user data. In certain embodiments, the user data supplier server 894 may be configured to provide the collected user data to user data aggregator server 893. In some embodiments, the user data supplier server 894 may collect and/or provide unique user data and/or non-unique user data. In certain embodiments, the user data supplier server 894 may aggregate the collected user data. In some embodiments, the user data supplier server 894 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device and/or between other networks.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A computer program product, embodied in a non-transitory computer readable medium, the non-transitory computer readable medium having stored thereon a sequence of instructions which, when loaded into a memory and executed by a processor causes the processor to perform a set of acts, the set of acts comprising:

gamifying a non-gaming application using auditing data of the non-gaming application by:

accessing electronic records comprising a set of application auditing specifications that identify one or more business transaction types to be executed by a data processing application of the non-gaming application;

identifying one or more database transactions corresponding to the one or more business transaction types that is observed during operation of the data processing application in accordance with the set of application auditing specifications;

performing measurements over the one or more business transaction types to determine a set of measured audit parameters corresponding to the one or more database transactions; and associating at least one of the measured audit parameters with at least one game parameter based at least in part on a mapping of a row of a first database table corresponding to the at least one of the measured audit parameters to an additional row of a second database table corresponding to the at least one game parameter, wherein user activity of the non-gaming application is monitored and stored as game data using the one or more database transactions generated from the user activity.

2. The computer program product of claim 1, further comprising the acts of:

receiving one or more transaction events from one or more client devices the respective transaction events associated with the one or more business transaction types;

generating one or more audit records responsive to receiving the respective transaction events having respective transaction identifiers included in the audit records; and determining one or more game results based at least in part on one or more audit records.

3. The computer program product of claim 1, further comprising the acts of:

receiving a selection identifying the data processing application.

4. The computer program product of claim 1, further comprising the acts of presenting: a user interface to receive a selection identifying the data processing application, the user interface comprising one or more of a set of form elements and a set of input entry elements, wherein the set of form elements comprise set of application form elements and a set of gamification form elements, at least one of the set of application form elements and the set of gamification form elements having a set of associated event handers and conforming to one or more of a data type and a data size, wherein the set of input entry elements allow identification of one or more of: a set of team members in a team-based game, a set of audit criteria used to determine the set of measured audit parameters, and a set of game features associated with the set of audit criteria.

5. The computer program product of claim 1, further comprising the acts of storing the set of measured audit parameters corresponding to the one or more database transactions in a first data structure comprising a first table having a first plurality of columns, the first plurality of columns describing a set of attributes of the set of measured audit parameters, the set of attributes comprising one or more of: a unique audit record identifier, a unique user identifier, and a date and time when the one or more database transactions occurred.

6. The computer program product of claim 1, further comprising the acts of determining one or more sets of game specifications based at least in part on the set of measured audit parameters corresponding to the one or more database transactions, wherein the one or more sets of game specifications comprise one or more of: a game context, a narrative, an objective, a duration, a role, a game metric, a game rule, a competitive dynamic, a collaborative dynamic, a game accomplishment, and a visual indicator.

7. The computer program product of claim 1, further comprising the acts of storing one or more sets of game specifications in a second data structure, the second data structure comprising a second table having a second plurality of columns, the second plurality of columns describing a set of additional attributes of a game, the set of additional attributes comprising one or more of: a unique game identifier, a game title, the one or more business transaction types, a game rule defining a game accomplishment, an item or an indicator associated with the game accomplishment, a type of game player, and a type of social dynamic.

8. The computer program product of claim 1, further comprising the acts of determining an association between one or more sets of game specifications and the one or more business transaction types based at least in part on information received from an administrator, wherein the association is between one or more of: an audit purpose and a game purpose, an audit role and a game role, an audit data source and a game data source, an audit metric and the game metric, an audit action and a game action, and a management report and a game accomplishment, wherein the audit action specifies a set of columns of a database table to be monitored for changes that relate to the audit metric and wherein the game action monitors at least the set of columns for changes that relate to the game metric, wherein the management report comprises a chart showing a result of the audit metric and the game accomplishment comprises one or more visual elements that show a relationship between the game accomplishment and progress related to the game metric, wherein the one or more visual elements comprise one or more of an avatar and a leader board.

9. The computer program product of claim 1, further comprising the acts of populating a third data structure with at least a game action based at least in part on a fourth data structure comprising at least an audit action.

10. The computer program product of claim 1, further comprising the acts of receiving an additional selection identifying one or more default game specifications or one or more custom game specifications.

11. The computer program product of claim 1, further comprising the acts of monitoring user activity associated with interaction with the data processing application.

12. The computer program product of claim 1, further comprising the acts of launching one or more games.

13. The computer program product of claim 1, further comprising the acts of determining one or more default game specifications based at least in part on one or more of: pre-existing performance instrumentation, a set of pre-existing audit specifications, a set of pre-existing audit rules, and a set of pre-existing audit data.

14. The computer program product of claim 1, further comprising the acts of storing a user activity associated with interaction with the data processing application.

15. The computer program product of claim 1, further comprising the acts of evaluating the user activity associated with interaction with the data processing application against one or more sets of game specifications.

16. The computer program product of claim 1, further comprising the acts of publishing a set of game results based at least in part on evaluating the user activity associated with interaction with the data processing application against one or more sets of game specifications, at least some of the set of game results displayed in an account summary.

17. The computer program product of claim 1, wherein the electronic records further comprise a set of application specifications that define a behavior of the data processing application and a set of business data describing the one or more business transaction types executed by the data processing application, the set of application specifications comprising at least a set of event specifications, the set of event specifications stored in a fifth data structure having a plurality of columns that associate the one or more business transaction types with one or more form element events initiated by a user of the data processing application.

18. The computer program product of claim 1, wherein the set of measured audit parameters comprise one or more of: a count of one or more transaction records, a rate of occurrence of new transactions, a rate of occurrence of updates to transactions, a rate of occurrence of closed transactions, and a rate of occurrence of updates to a table.

19. A method comprising:
gamifying a non-gaming application using auditing data of the non-gaming application by:
  accessing electronic records comprising a set of application auditing specifications that identify one or more business transaction types to be executed by a data processing application of the non-gaming application;
  identifying one or more database transactions corresponding the one or more business transaction types that is observed during operation of the data processing application in accordance with the set of application auditing specifications;
  performing measurements over the one or more business transaction types to determine a set of measured audit parameters corresponding to the one or more database transactions; and
  associating at least one of the measured audit parameters with at least one game parameter based at least in part on a mapping of a row of a first database table corresponding to the at least one of the measured audit parameters to an additional row of a second database table corresponding to the at least one game parameter, wherein user activity of the non-gaming application is monitored and stored as game data using the one or more database transactions generated from the user activity.

20. A system comprising:
a storage device to access electronic records comprising a set of application auditing specifications that identify one or more business transaction types to be executed by a data processing application of a non-gaming application;
an audit module to:
  identify one or more database transactions corresponding to the one or more business transaction types that is observed during operation of the data processing application in accordance with the set of application auditing specifications, and
  perform measurements over the one or more business transaction types to determine a set of measured audit parameters corresponding to the one or more database transactions; and a gamification module to gamify the non-gaming application by associating at least one of the measured audit parameters with at least one game parameter based at least in part on a mapping of a row of a database table corresponding to the at least one of the measured audit parameters to an additional row of an additional database table corresponding to the at least one game parameter, wherein user activity of the non-gaming application is monitored and stored as game data using the one or more database transactions generated from the user activity.

21. A computer program product, embodied in a non-transitory computer readable medium, the non-transitory computer readable medium having stored thereon a sequence of instructions which, when loaded into a memory and executed by a processor causes the processor to perform a set of acts, the set of acts comprising:

integrating gaming dynamics into a non-gaming application using auditing data of the non-gaming application with by:

receiving an electronic record comprising an application auditing specification that identifies a transaction to be executed by a data processing application of the non-gaming application, wherein a database transaction is associated with the transaction in accordance with the application auditing specification, performing a measurement over the transaction to determine a measured audit parameter corresponding to the database transaction, and associating the measured audit parameter with a parameter that corresponds to a game specification, wherein user activity of the non-gaming application is monitored and stored as game data using the database transaction generated from the user activity.

22. The computer program product of claim 21, wherein the game specification comprises at least one of: a first parameter that describes a game to be executed, a second parameter that describes a game context of the game, a third parameter that describes a game metric of the game, a fourth parameter that describes a game accomplishment of the game, or any combination thereof.

23. The computer program product of claim 21, further comprising the acts of determining a second game specification based at least in part on the measured audit parameter corresponding to the database transaction, wherein the second game specification comprises at least one of: a game context, a narrative, an objective, a duration, a role, a game metric, a game rule, a competitive dynamic, a collaborative dynamic, a game accomplishment, or a visual indicator.

24. The computer program product of claim 21, further comprising the acts of storing the game specification in a data structure, the data structure comprising a table having a plurality of columns, the plurality of columns describing a set of attributes, the set of attributes comprising one or more of: a unique game identifier, a game title, the transaction, a game rule defining a game accomplishment, an item or an indicator associated with the game accomplishment, a type of game player, and a type of social dynamic.

25. The computer program product of claim 21, wherein the measured audit parameter comprises at least one of: a count of one or more transaction records, a rate of occurrence of new transactions, a rate of occurrence of updates to transactions, a rate of occurrence of closed transactions, or a rate of occurrence of updates to a database table.

* * * * *

UNITED STATES PATENT AND TRADEMARK OFFICE
CERTIFICATE OF CORRECTION

PATENT NO. : 10,572,094 B2
APPLICATION NO. : 15/984775
DATED : February 25, 2020
INVENTOR(S) : Javed Lal Mohammed Ameerjan et al.

It is certified that error appears in the above-identified patent and that said Letters Patent is hereby corrected as shown below:

In the Drawings

On sheet 12 of 21, in FIG. 5A, under Reference Numeral 556, Line 2, delete "specfications" and insert -- specifications --, therefor.

In the Specification

In Column 10, Line 45, delete "etc.)," and insert -- etc.). --, therefor.

In Column 21, Line 20, delete "PTSN," and insert -- PSTN, --, therefor.

In Column 22, Line 15, delete "10" and insert -- IO --, therefor.

In Column 25, Line 31, delete "10" and insert -- IO --, therefor.

In the Claims

In Column 32, Line 34, in Claim 19, before "the" insert -- to --.

Signed and Sealed this
Tenth Day of November, 2020

Andrei Iancu
*Director of the United States Patent and Trademark Office*